United States Patent [19]
Mizoguchi et al.

[11] Patent Number: 5,333,038
[45] Date of Patent: Jul. 26, 1994

[54] IMAGE FORMING APPARATUS FOR CONTROLLING A SIZE OR A COLOR TONE OF A TONER IMAGE

[75] Inventors: Yoshimi Mizoguchi; Hiroshi Ishii; Kiyoshi Kimura; Masakazu Fukuchi; Makoto Takeda, all of Hachioji, Japan

[73] Assignee: Konica Corporation, Tokyo, Japan

[21] Appl. No.: 958,001

[22] Filed: Oct. 8, 1992

[30] Foreign Application Priority Data

Oct. 17, 1991 [JP] Japan .................. 3-269594
Jul. 16, 1992 [JP] Japan .................. 4-189570
Jul. 24, 1992 [JP] Japan .................. 4-198747

[51] Int. Cl.⁵ .................................. G03G 21/00
[52] U.S. Cl. ........................ 355/208; 346/160; 346/157; 355/219; 355/233; 355/246; 355/282; 355/326 R
[58] Field of Search ............ 355/326, 327, 208, 282, 355/285, 246, 233, 219, 290, 295; 346/160, 157, 1.1

[56] References Cited

U.S. PATENT DOCUMENTS

| | | | |
|---|---|---|---|
| 4,835,545 | 5/1989 | Mager et al. | 346/1.1 |
| 4,896,173 | 1/1990 | Shimada et al. | 346/160 X |
| 5,128,698 | 7/1992 | Crawford et al. | 346/160 |
| 5,128,699 | 7/1992 | Nakajima et al. | 346/160 |

FOREIGN PATENT DOCUMENTS

60-211483 10/1985 Japan .
60-216359 10/1985 Japan .
61-186976 8/1986 Japan .
1-300244 12/1989 Japan .
3-288171 12/1991 Japan .
4-60536 2/1992 Japan .

*Primary Examiner*—A. T. Grimley
*Assistant Examiner*—Shuk Y. Lee
*Attorney, Agent, or Firm*—Frishauf, Holtz, Goodman & Woodward

[57] ABSTRACT

In a toner image forming apparatus capable of changing the fixing condition of a fixing device to fix a toner image on a recording sheet, there is provided a control device to change at least one of the charging condition of a charging device, the exposure condition of the exposing device and the developing condition of the developing device to change the toner amount in the toner image in accordance with the change in the fixing condition.

21 Claims, 16 Drawing Sheets

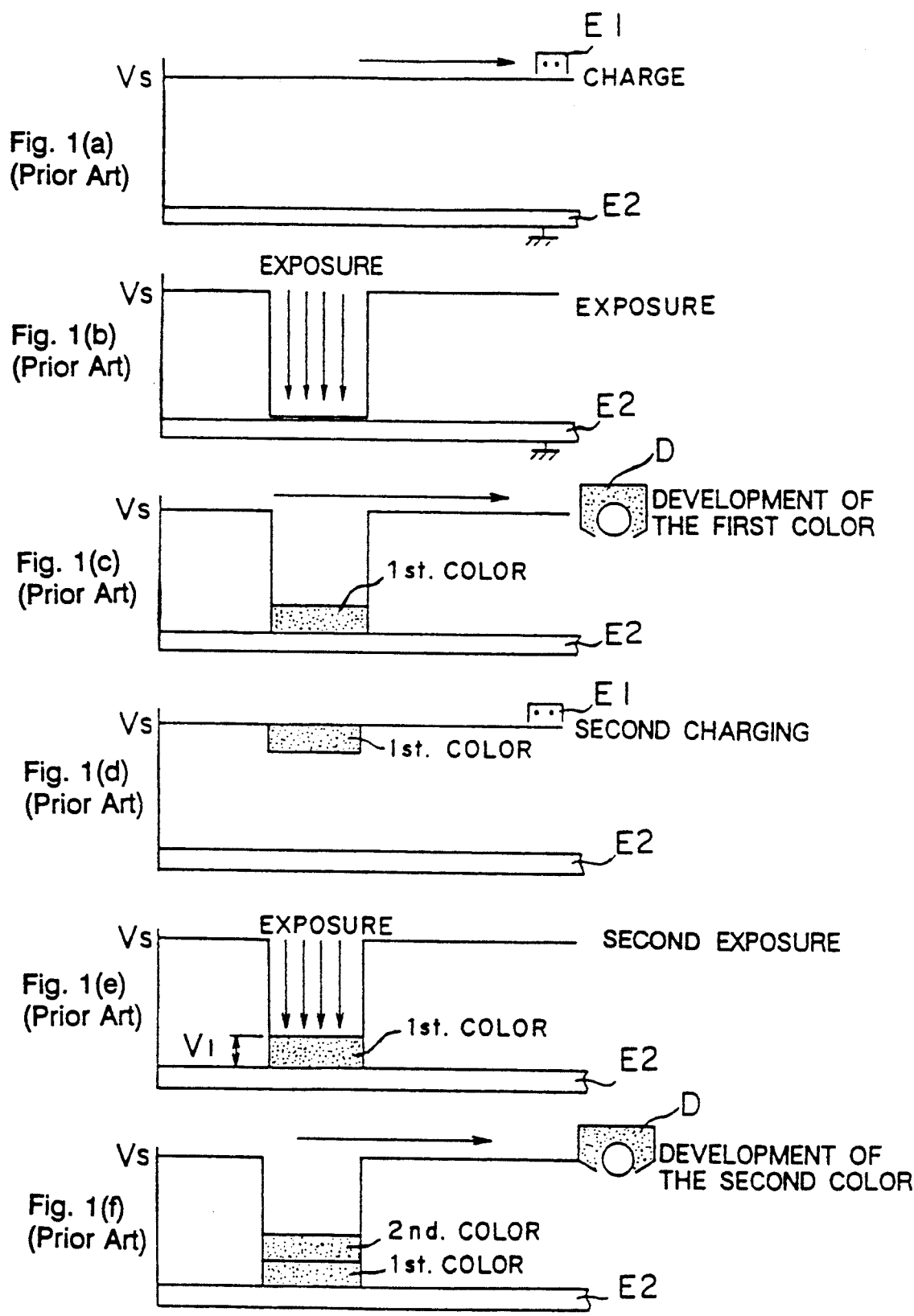

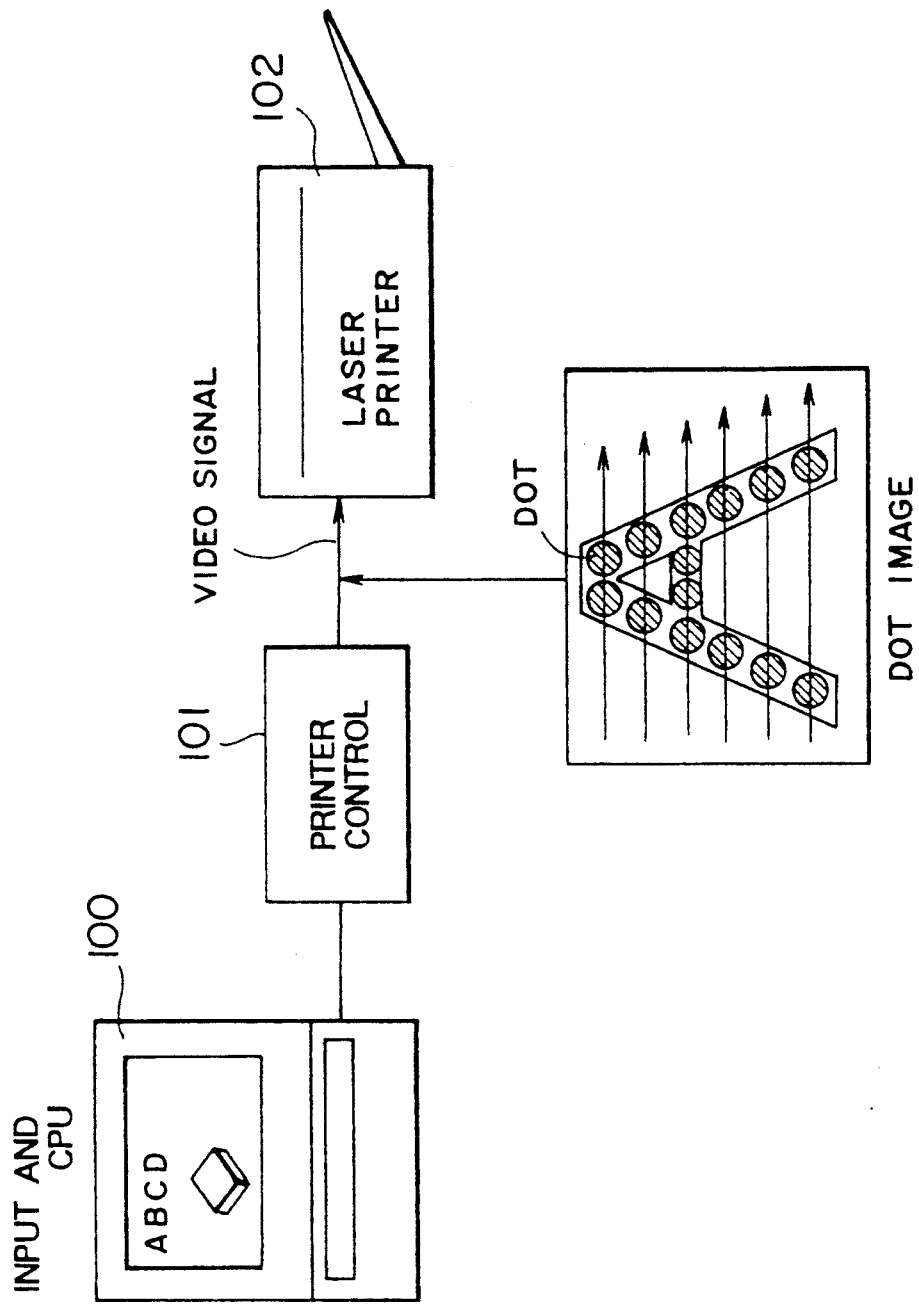

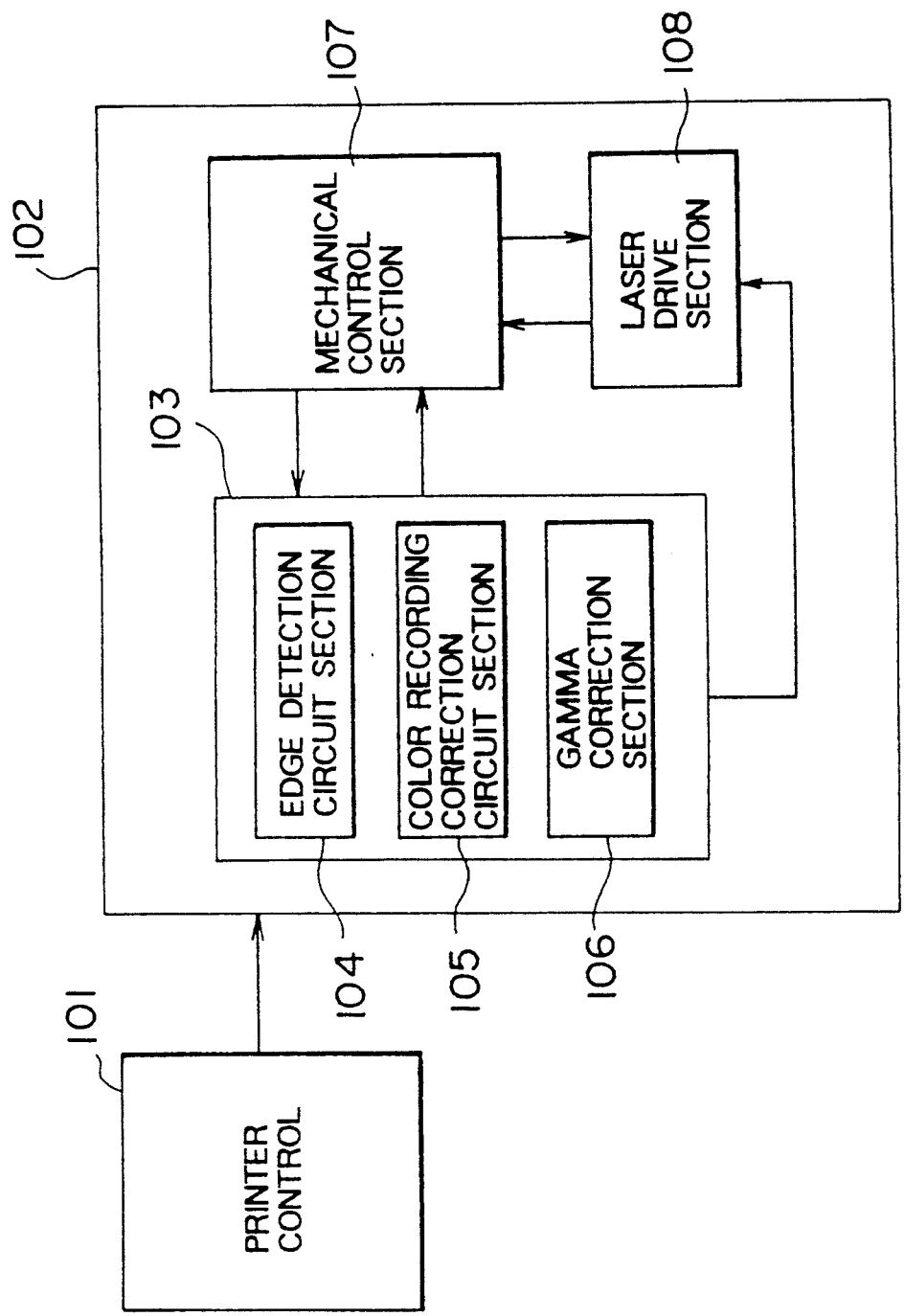

IMAGE FORMING APPARATUS FOR CONTROLLING A SIZE OR A COLOR TONE OF A TONER IMAGE

BACKGROUND OF THE INVENTION

The present invention relates to an image forming apparatus, for example, a color image forming apparatus in which an electrostatic latent image is formed on an image carrier using a laser beam source, and a plurality of developing processes are repeatedly conducted using color toners, and more particularly relates to an image forming apparatus in which the fixing condition is changed in the process of color image formation in order to form a desired color image accurately.

The change of the fixing condition will be described as follows. In a monocolor or full color image forming apparatus, toner images are transferred onto a transparent resin film (usually referred to as an OHP sheet) for use in an overhead projector. In the case of an OHP sheet, light permeability is a requisite. However, irregular reflection is caused on the surface of the OHP sheet, so that the image tends to become black when the same fixing condition as that used for a regular paper is adopted. Therefore, the OHP sheet must be heated to a higher temperature than that of the regular paper in order to improve the surface property of a toner layer. This can be realized when the temperature of the fixing unit is raised or the feed speed of the transfer sheet is reduced. On the other hand, in the case of a regular paper, it is not desirable to a heat the paper to high temperature or to reduce the feed speed. Therefore, the fixing condition of the regular paper and that of the OHP sheet must be changed. However, when the fixing condition is changed, the grade of deformation of a dot and line is varied. Consequently, in the case of the OHP sheet, the line width and dot diameter are increased.

When the OHP sheet is subjected to a usual fixing process in which the transfer sheet is heated to a standard fixing temperature (about 180°), the transmitting property is low since the smoothness of the OHP sheet surface is low. Therefore, when the feed speed is lowered to 1/6, the toner layer is sufficiently fused into the OHP sheet, so that the permeability can be improved. However, this low speed is disadvantageous in that the dot portion of the toner image becomes bold and the line also becomes bold.

As an example of image formation in which the fixing condition is changed, the following case can be considered: in order to obtain a desired glossy image, the fixing condition is changed. In this case, an excellent image can not be provided only when the fixing condition is changed.

Therefore, the first object of the present invention is to obtain an excellent toner image in the following manner: after a toner image has been transferred onto a transfer sheet, the transferred toner image is fixed so that the dot diameter and line width of the fixed image are not varied by fixing conditions such as the state of fusion and fixing speed.

A conventional electrophotographic color image forming method by which color images are formed when color toner images are superimposed, will be explained as follows. At first, as shown in FIG. 1(a), image carrier E2, on which a color toner image is formed, is charged for the first time by a charging electrode E1 so that the surface potential of the image carrier can be $V_S$. Next, only a portion of an image on which a character or a line image is formed is exposed by a laser beam as shown in FIG. 1(b). After the exposure has been completed, only the exposed portion is discharged and the surface potential $V_S$ is lowered, and non-image portions are not discharged. Next, as shown in FIG. 1(c), the image carrier E2 is moved in the arrowed direction and the first color development is conducted by a developing unit D. In this case, the electrical charge is eliminated from the exposed portion on image carrier E2 by the method of "well type electrical charge erasing" as shown in FIG. 1(b), and the first color toner is adhered onto the eliminated portion, and then the first color toner is developed so that the first color toner image is formed. Next, the second charging is conducted by charging electrode E1 on the image carrier surface including the first color toner image portion, as shown in FIG. 1(d). In FIG. 1(d), for the convenience of explanation, the first color toner image is illustrated at the position of electrical charge $V_S$, separated from the surface of image carrier E2. Next, as shown in FIG. 1(e), when the second exposure is conducted on the first color toner image, the electric charge can be eliminated from the exposed portion on the image carrier by the method of "well type electrical potential erasing" in the same manner as shown in FIG. 1(b). Then, the second color toner is developed by developing unit D so that the second color toner image is superimposed on the first color toner image. The foregoing is a basic process in which a color image is formed on the image carrier when color toner images are superimposed on each other. The specific means of the aforementioned color toner forming means is as follows: as shown in FIG. 2, a display 100 is used in which a computer (referred to as a CPU, hereinafter) is provided; data is inputted into the CPU through a key inputting means mo be stored by a magnetic recording means; and the recorded characters, lines and solid images are outputted into a printer controller 101. From the printer controller 101, dot images, for example, character A and the like are successively outputted, and the dot signals are inputted into a laser printer 102, and then a toner image is formed by the laser printer 102 through the processes of (a), (b), (c), (d), (e) and (f) illustrated in FIG. 1.

In order to obtain a color toner image by the aforementioned color toner superimposing system, there are 2 exposure methods, one is a pulse control method, and the other is a laser beam intensity control method. For example, when red is made from yellow and magenta, the color tone must be delicately adjusted in the following manner: yellow is strengthened and magenta is weakened; and on the contrary, yellow is weakened and magenta is strengthened. In order to control the color tone and obtain a desired color toner image, the exposure condition is changed so that the mixing ratio of color toner images can be changed. In the aforementioned color image forming process, when the second color exposure is conducted on the first color toner image, the first color toner layer is greatly affected by the second color exposure. Accordingly, the aforementioned color toner image forming method is disadvantageous in that it is difficult to appropriately control color toner development.

The aforementioned color toner image forming method has the following disadvantages. As shown in FIG. 3, the image signal outputted from the CPU to the printer controller 101 includes a dot image signal representing a character, a line signal and a solid image signal. First, FIG. 3 is explained as follows. A pulse-like electrical image signal is inputted into the printer controller 101 as shown in FIG. 3(b). In FIG. 3, signals are successively inputted from the left, and first, a dot image signal is inputted. A little after that, a solid image signal is inputted. These input signals are outputted to the laser printer 102 from the printer controller 101 in the form of a video signal.

The above-described video signal is converted into pulse signals by a pulse modulation circuit in the laser printer 102, and an ON signal corresponding to a dot image output signal is generated and a pulse having a constant width is formed. Next, a solid image video signal is inputted into the laser printer 102 after an interval, and when a pulse signal having a constant width and a constant interval is turned on, the solid image output signal is outputted. When this is illustrated by the light energy intensity as shown in FIG. 3(a), for example, when a duty ratio of the exposure unit is adjusted to 50% in order to limit an adhered amount of the first color, and it is adjusted to 100% for the second color, at the time when a distribution of the optical energy density which is received by the photoreceptor, is illustrated, a large difference of the energy density is generated between the 50% duty ratio in the case of a dot image, and the 50% duty ratio in the case of a solid image. That is, in the case of the solid image, an energy amount is a total of the energy of dots which are close in position to each other. Therefore, an average energy of the solid image is larger than that of an independent isolated dot, one dot line, or an edge portion of the solid image. Accordingly, the difference of the optical energy of the solid image portion between the case of 50% duty ratio and the case of 100% duty ratio, is reduced as shown in FIG. 3(a). In this condition, when the surface potential curve in which the image carrier shown in FIG. 1 is exposed, is shown in FIG. 3(b), the difference of the surface potential of the dot image between the case of 50% duty ratio and the case of 100% duty ratio is $VS_1$, which is large. That is, the surface potential in the case of 100% duty ratio is lowered by $VS_1$ than that in the case of 50% duty ratio In contrast to such a condition, even when the electric charge is eliminated by the image exposure of the solid image in the case of the 50% duty and in the case of the 100% duty, the difference of the surface potential of the solid image is $VS_2$, as shown in the drawing, which is very small. After the above-described charging, and image exposure processing, and developing processing are conducted, when the image forming processing shown by FIGS. 1(c), (d), (e), (f) is conducted, a condition of the electric charge elimination by the exposure in the 50% duty ratio, is shown in FIG. 3(c). In the dot portion and the solid image portion, since the potential drop of the dot portion is small, when developing is conducted by the developing unit D as shown in FIG. 4(a), an adhered amount of toner is very small, and since the potential drop of the solid image portion is large, toner is fully adhered to the portion. Next, charging is conducted again on the toner image in the first color development as shown in FIG. 4(b), and the second exposure of the 100% duty is conducted for the second color development as shown in FIG. 4(c). In general, when the second exposure is conducted after the first toner image has been formed on image carrier E2, it is necessary to increase light intensity since the second exposure is conducted through the first toner image. For that reason, light energy of duty 100% is projected on both the dot portion and the solid image portion. In this case, the toner adhesion amount of the dot portion on image carrier E2 is small in the first color toner image development, so that a large amount of light energy is projected to the dot portion. Accordingly, the electrical charge on the dot image portion is greatly reduced. On the other hand, the toner adhesion amount of the solid image portion on image carrier E2 is large, so that a small amount of light energy is projected. Consequently, as shown in the drawing, erasing of electrical charge in the solid image portion is smaller than that in the dot portion. AS described above, there is a large difference between the attenuation ratio of the dot portion and that of the solid image portion. In this case, when the second color toner image is developed by developing unit E1, a large amount of toner is adhered onto the dot portion since a large amount of electrical charge is erased in this portion. Therefore, the adhesion amount of the second color toner in the dot portion is far larger than that of the first color toner, so that it is difficult to adjust colors. However, in the case of the solid image portion, the toner adhesion amount of the first color and that of the second color are uniform so that a desired toner image can be obtained. As explained above, when the same charging operation is conducted on the dot and solid image portions and further the exposure of the same light intensity is conducted, it is impossible to obtain excellent color tone.

The present invention has solved the aforementioned problems. The second object of the present invention is to solve the following problem: when a color image is formed by superimposing a plurality of color toner images according to the image information of a character, dot, line and solid image outputted from the CPU image memory, the second color toner can not be adhered onto the image carrier in the same manner as the first color toner; and desired color reproduction can not be carried out. It has been found that there is a difference between the toner adhesion amount of the central portion of an image and that of the edge portion, so that problems are caused in color reproduction. The present invention is to reproduce a desired color image in this manner: when an image signal provided to the exposure means is modulated after the aforementioned image information has been inputted into the image forming apparatus in which a photoreceptor is adopted, a desired controlling operation is conducted on the exposure means.

The abovementioned first object can be accomplished when the control means with regard to the exposure means is utilized. That is an excellent image can be provided, irrespective of the change of the fixing condition, when exposure means is controlled rather than correcting the fluctuation of a fixed image caused in the case of change of the fixing condition.

SUMMARY OF THE INVENTION

In order to solve the aforementioned problems and accomplish the second object, the present invention is to provide an image forming apparatus comprising: an image carrier on which a toner image is formed; a charging means to uniformly charge the surface of said image carrier; an image exposure means modulated by an image signal so that a dot image can be written on the surface of said image carrier; a developing means to adhere toner onto an electrostatic latent image formed on the surface of said image carrier; a fixing means to fix the toner image that has been transferred onto a transfer sheet; a first control means to change the fixing condition of said toner image; and a second control means to control the toner adhesion amount of the image when the operating condition of at least one of said charging means, image exposure means and developing means is variably controlled being linked with the change of said fixing condition.

In this case, the change of said fixing condition is carried out in such a manner that at least one of the temperature and fixing speed is changed. Said fixing means is a thermal roll type fixing means, and the change of said fixing condition is carried out in such a manner that the pressure is changed. Said toner adhesion amount control is carried out in such a manner that the developing bias of the developing means is changed. Said toner adhesion amount control is carried out in such a manner that the exposure amount of the exposure means is changed. Said exposure means is one of a laser beam source, LED array, or a liquid crystal shutter device, and when the exposure amount is changed, the toner adhesion amount is controlled. Said toner adhesion amount control is carried out when the duty ratio of the exposure means is changed.

In order to accomplish the aforesaid first object, the present invention is to provide an image forming apparatus comprising: an image carrier to form a toner image; a charging means to uniformly charge the surface of said image carrier; an image exposure means modulated by an image signal so that a dot image can be written on the surface of said image carrier; a developing means to adhere toner onto an electrostatic latent image formed on the surface of said image carrier; a fixing means to fix the toner image that has been transferred onto a transfer sheet; a first control means to change the fixing condition of said toner image; a second control means to control the toner adhesion amount of the image when the operating condition of at least one of said charging means, image exposure means and developing means is variably controlled being linked with the change of said fixing condition; and a discrimination means to output a signal. showing that the dot of said image forming signal is an isolated dot or a dot on the edge.

An embodiment of the present invention is an image forming apparatus comprising: an image carrier to form a toner image; a charging means to uniformly charge the surface of said image carrier; an image exposure means modulated by an image signal so that a dot image can be written on the surface of said image carrier; a developing means to adhere toner onto an electrostatic latent image formed on the surface of said image carrier; a fixing means to fix the toner image that has been transferred onto a transfer sheet; a first control means to change the fixing condition of said toner image; and a second control means to control the toner adhesion amount of the image when the operating condition of at least one of said charging means, image exposure means and developing means is variably controlled being linked with the change of said fixing condition, wherein said image exposure condition is changed being linked with the change of said fixing condition.

The present invention is to provide a color image forming apparatus comprising: an image carrier to form a toner image; a charging means to uniformly charge the surface of said image carrier; an image exposure means modulated by an image signal so that a dot image can be written on the surface of said image carrier; a plurality of developing means to successively adhere toners of different colors onto an electrostatic latent image formed on the surface of said image carrier; a fixing means to fix the toner image that has been transferred onto a transfer sheet; and a first control means to change the fixing condition of said toner image, wherein the adhesion amount of each color toner is controlled when said image exposure means is changed being linked with the change of said fixing condition.

In order to accomplish the second object, the present invention is to provide an image forming apparatus in which a latent image is formed on an image carrier by an exposure means, the exposing light of which is modulated by an image formation signal, and the formed latent image is developed by a developing means using toner, wherein said image forming apparatus includes a toner image forming means that successively superimposes developed toner images to form a color toner image, said toner image forming means comprising: an adjusting means to adjust the adhesion amount of toner of the first toner image and that of the second toner image; a discrimination means to discriminate an isolated dot or a dot at the edge; and a control means that controls the adjusting condition of said toner adhesion amount adjusting means according to the result of discrimination obtained by the discrimination means so that the adjusting condition of a discriminated isolated dot or a dot at the edge, and the adjusting condition of a portion apart from said dot portion, can be made different.

BRIEF DESCRIPTION OF THE DRAWINGS

FIGS. 1 (a), 1(b), 1(c), 1(d), 1(e) and 1(f) are views showing processes of an image forming means to which a conventional two times developing method of charging. exposing, controlling, and developing is applied.

FIGS. 2 (a) and 2(b) are views showing locations from a CPU to a laser printer in the image forming apparatus.

DETAILED DESCRIPTION OF THE PREFERRED EMBODIMENT

Firstly, an exposure control to obtain a desired image is described in detail.

Figure 6:
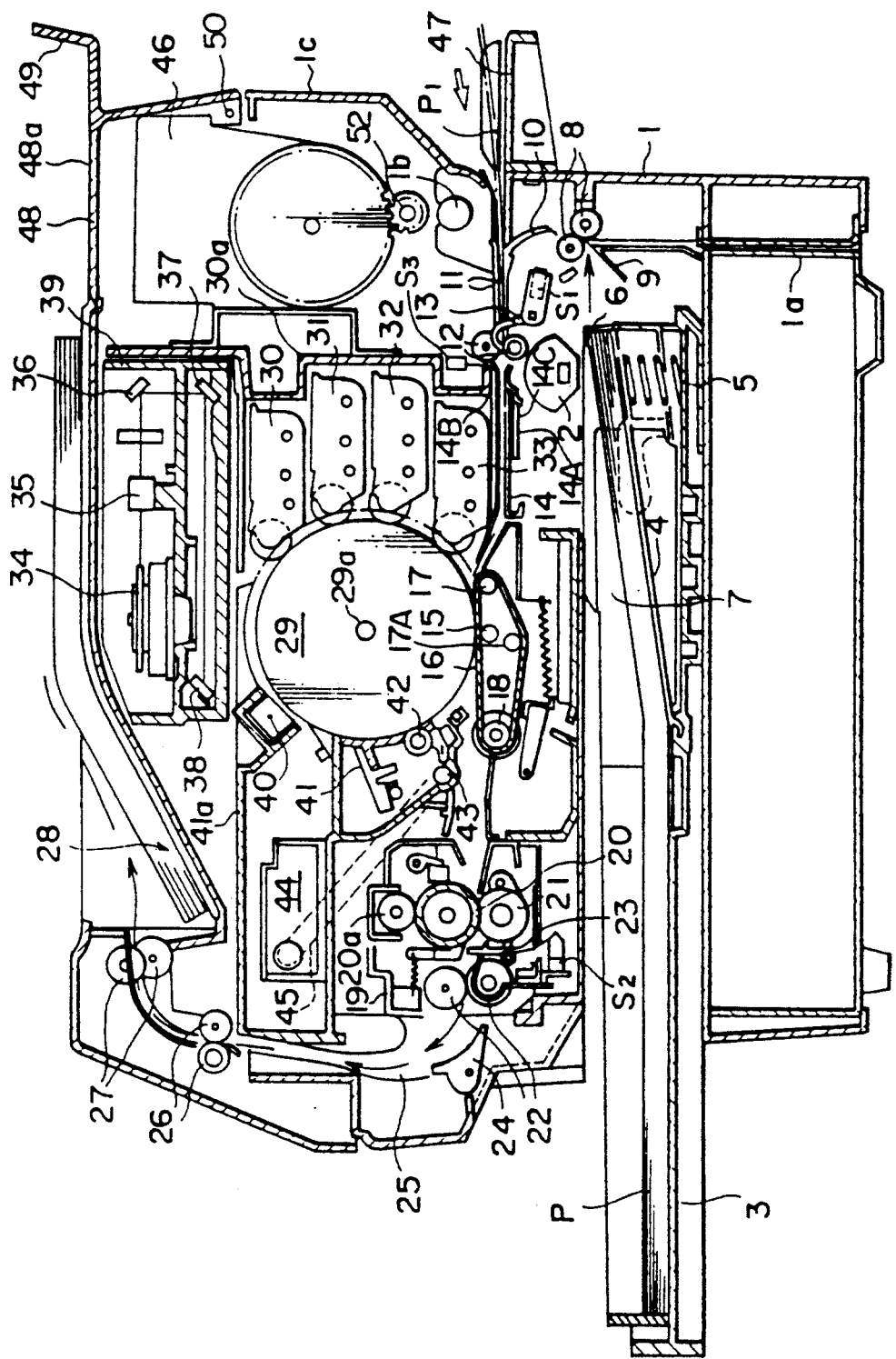
FIG. 6 is a vertical sectional view of the image forming apparatus to which the image forming means of the present invention is applied.

In FIG. 1(a), at first, the entire surface of an image carrier 29 shown in FIG. 6 is charged by a charging electrode 40 of a scorotron system. Next, as shown in FIGS. 2(a), and 2(b), a character, a line, and a dot line are outputted as a dot signal and a solid image area is outputted as a solid image signal in a video signal from a printer controller 101, and a first color is outputted as an image signal in which both signals are mixed. A means by which the dot signal or the solid image signal is selected is used in this system. The video signal outputted from the printer controller 101 is received by a control means in a laser printer 102. In the control means in the laser printer 102, as shown in FIG. 2(b), an image signal processing unit 103 having an edge detecting circuit 104, a color compensating circuit 105, and a gamma compensating unit 106, is built-in, and further a mechanical controller 107 and a laser drive unit 108 are provided.

In the structure described above, for example, when a character A shown in FIG. 2(a) is outputted in the form of a dot image in the video signal, an edge portion is detected by an edge detecting circuit 104. In the edge detecting circuit, a matrix composed of $3 \times 3$ pixels is used, and the edge detection circuit discriminates whether a target pixel belongs to an isolated dot or an edge portion, or dots not belong to the edge portion at each pixel, corresponding to a density change with respect to an adjoining pixel in a primary scanning direction and a subsidiary scanning direction. Further, a color recording image is compensated by the color compensating circuit 105 and gamma is compensated by the gamma compensating circuit, input/output control is conducted between the image signal processing unit 103 and the mechanical controller 107, and further, input/output control is conducted also between the mechanical controller 107 and the laser drive unit 108. The signal which discriminates whether the target pixel belongs to the isolated dot or the edge portion, or does not belong to the edge portion at each pixel, is sent to the laser drive unit 108. In the laser drive unit 108, exposure is conducted by controlling a laser light source in the following manner: the above-described signal is sent to the laser printer 102 as an electric signal corresponding to the isolated dot or the edge dot, or the solid image signal; in the case of the dot image, exposure is conducted by a laser light modulation signal so that a pulse width $L_1$ can be a duty ratio 80%; and in the case of the solid image, exposure is conducted so that a modulated pulse width $L_2$ of the laser light can be a duty ratio 60% for a constant period of time as described above.

When the aforementioned pulse width is utilized, the pulse width becomes a duty ratio of 80% in the dot portion, and electrical charge $V_S$ of the solid image on the image carrier 29 is removed at a duty ratio of 60%.

Figure 5A:
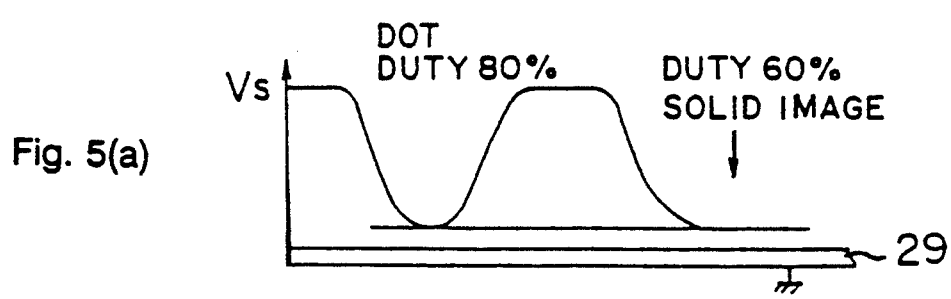
FIGS. 5 (a), 5(b), 5(c), 5(d), 5(e) and 5(f) are views showing color toner development of the present invention in a dot image and solid image.
Figure 5B:
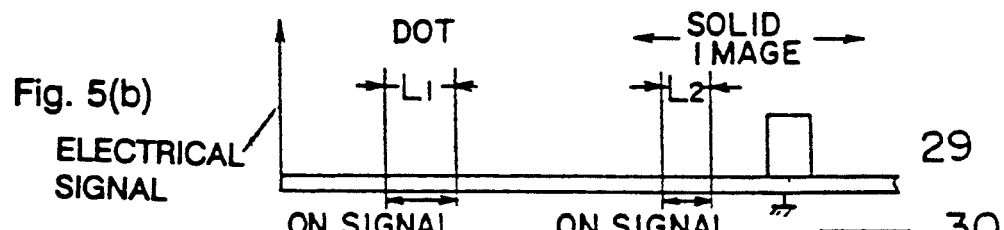
Figure 5C:
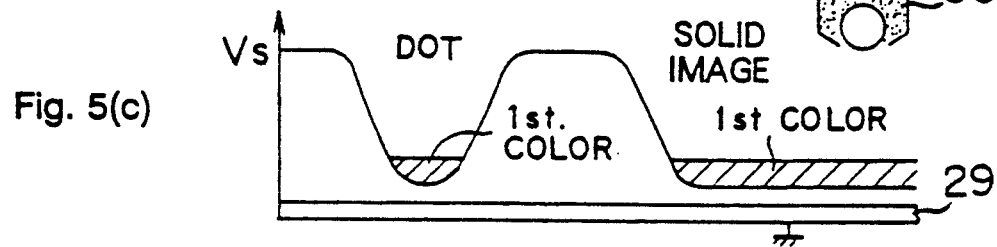
Figure 5D:
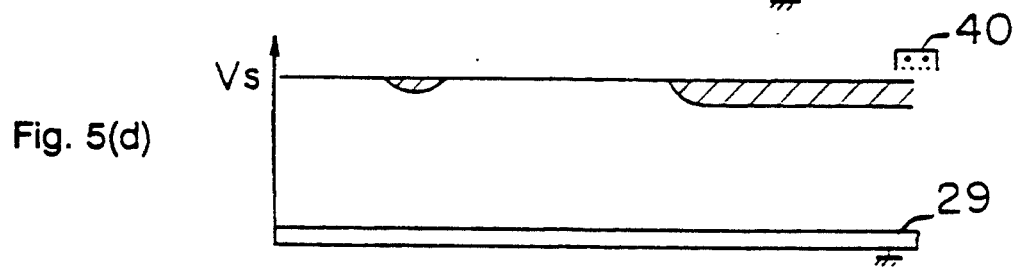
Figure 5E:
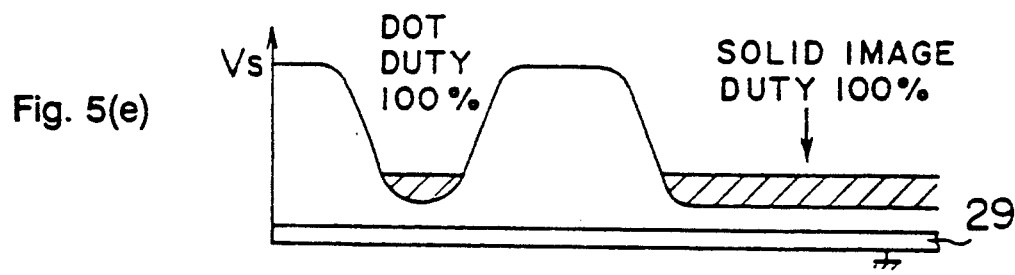

As shown in FIG. 5(a), after the electrical has been removed, the electrical potential of the dot portion on the image carrier, and that of the solid image portion become the same. When development is carried out by the developing unit 30 under the aforementioned condition, the thickness of the first color toner of the dot portion and that of the solid image portion become the same as shown in FIG. 5(c).

Figure 5F:
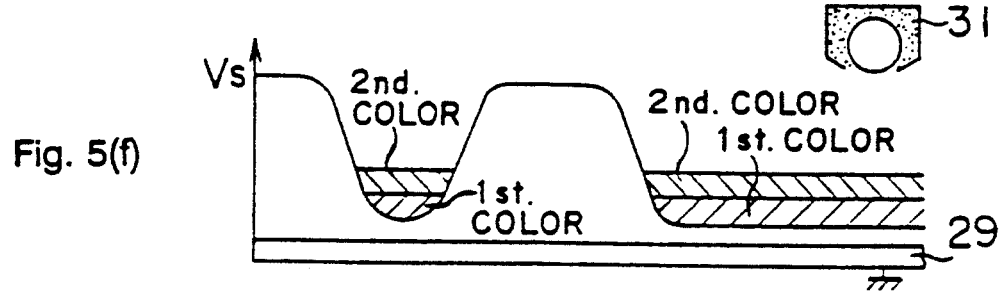

Next, an electrical charge is given on the entire surface of the image carrier including the dot and solid image portions by the charging electrode 40, and then the electrical charge of the dot portion and that of the solid image portion are removed when conventional exposure of 100% duty ratio is carried out. Even in this case, the toner thickness of the dot image portion and that of the solid image portion are the same in the development process, so that the potential attenuation ratios of both portions become the same when the electrical charge is removed. As shown in FIG. 5(f), in both the dot and toner portions, the toner thickness of the second color becomes the same as that of the first color when development is conducted by the developing unit 31.

The structure of a printer to which the process of the aforementioned image forming apparatus is applied, will be explained as follows.

In FIG. 6, numeral 1 is a lower frame of the image forming apparatus, a half-moon-shaped sheet feed roller 2 by which a recording sheet P, which is a transfer body, is fed is provided in the lower frame, and a sheet feed cassette 3 in which a plurality of recording sheets P are loaded, is detachably provided in the lower frame 1. A push-up plate 4 which is pushed up by a spring 5 is provided in the sheet feed cassette 3, the recording sheets P are loaded on the plate 4, and a separation claw 6 which is rotatably provided to a portion of the sheet feed cassette 3, is engaged with the uppermost portion of tips of the recording sheets P. Numeral 7 is a guide plate by which both sides of the recording sheet P are guided, and which is adjustably provided depending on a size of the recording sheet. The aforementioned structures are adopted for the sheet feed cassette 3. Numeral 8 is a conveyance roller for the recording sheet P which is provided in the lower frame 1, and provided between the guide plate 9, by which the tip of the recording sheet P fed by the sheet feed roller 2 is guided, and a reversal guide plate 10.

Numeral 11 is a guide plate which guides the recording sheet P to a registration roller 12 after the recording sheet P is reversely fed. Numeral 13 is a swing member by which a sensor $S_1$, which is used for detecting the recording sheet P at the position of the registration roller 12, is turned ON, and OFF. Numeral 14 is a guide plate by which the recording sheet P is guided to the direction of a transfer belt 15 after the recording sheet P has passed the registration roller 12, and the transfer belt 15 is provided around a transfer roller 16, a roller 17, and a drive roller 18. Numeral 15a is a cleaning means by which the surface of the transfer belt 15 is cleaned. Numeral 19 is a fixing unit by which an image, which has been transferred onto the recording sheet P, is fixed, and which is composed of a thermally fixing roller 20 and a pressure contact roller 21, and the thermally fixing roller 20 is contacted with a cleaning roller 20a with pressure, and is cleaned when it is rotated. Numeral 22 is a sheet delivery roller by which the recording sheet P is delivered from the fixing unit 19, and a swing member 23, by which a sensor $S_2$ is turned on and off so that the delivery of the recording sheet P can be ensured, is actuated by the recording sheet P when it is delivered. A delivery sheet tray 28 is structured so that the recording sheet P is delivered on the delivery sheet tray 28 which is provided on the almost entire surface of the upper portion of an upper frame 1c, by a recording sheet guide member 24, a guide path 25 which is formed on the upper frame 1c, and conveyance rollers 26 and 27. An image carrier 29 for image formation, (which will be called a photoreceptor drum 29, hereinafter), is provided to an almost central portion of the upper frame 1c, and a developing unit frame 30a is provided in the manner that: four pairs of developing units 30, 31, 32, and 33 can be located from the above along the surface of the photoreceptor drum 29. Numeral 34 is a polygonal mirror by which laser beams irradiated from a laser beam source (not shown in the drawing) are passed through an f$\theta$ lens 35, and the laser beams are reflected by reflection mirrors 36, 37, and 38, and expose the photoreceptor drum 29. Numeral 39 is an optical system frame into which an optical system composed of the polygonal mirror 34, and reflection mirrors 36, 37, and 38, is integrally assembled, and which is assembled into the uppermost portion of the upper frame 1c.

Numeral 40 is a charging electrode by which the entire surface of the photoreceptor drum 29 is charged, and is provided in a portion of the upper frame 1c. Numeral 41 is a cleaning blade by which residual developer, which adheres to the surface of the photoreceptor drum 29 is cleaned after the image has been transferred onto the recording sheet P from the photoreceptor drum 29. A conveyance unit 43 by which the scraped developer is received and delivered to the outside of a cleaning unit, is provided, and a developer receiving member 42 by which the developer scraped off by the cleaning blade is effectively sent to the conveyance unit 43, is provided to the lower portion of the cleaning blade 41. The developer conveyed to the outside of the cleaning unit by the conveyance unit 43, is conveyed by a conveyer 45 to a container 44, which is structured so that a proper amount of the developer can be accumulated in the container, and the container can be abandoned when it is detached from the apparatus. Numeral 46 is developer containers by which developer is supplied to the developing units 30, 31, 32, and 33, and four pairs of the developer containers are provided in parallel with each other in the apparatus although only one pair of the developer container is shown in the drawing. The developer containers are structured in this manner manner that color developers, for example, cyan, magenta, yellow, and black are supplied respectively to the developing units 30, 31, 32, and 33 so that color development can be conducted. Numeral 47 is a hand feeding unit from which the recording sheet P is supplied by hand feeding. The lower frame 1 and the upper frame 1c are assembled around a support shaft 1b so that a conveyance path of the recording sheet P can be opened. When the recording sheet P is under a faulty conveyance condition during conveyance, and the recording sheet P can not arrive, at least, at the fixing unit 19, the upper frame 1c is opened around the support shaft 1b, so that the recording sheet can be removed. A guide plate 1a is provided by which the recording sheet P located in the lower frame 1 can be supplied from another sheet feed unit (not shown in the drawing).

The photoreceptor drum 29 is provided to a frame 41a to which the cleaning blade 41 is provided, through a support shaft 29a, which is supported by the upper frame 1c.

Numeral 48 is a cover provided in the upper portion of the developer container 46, and the cover 48 composes a portion of the upper frame 1c. A portion of the cover 48 forms a discharged paper tray surface 48a. A recording sheet check portion 49 to prevent a recording sheet from getting out of the tray, is provided in such a manner that the recording sheet check portion 49 is protruded from the discharged paper tray surface 48a. The cover 48 can be rotated around a shaft 50 provided to the upper frame 1c.

In the aforementioned image forming apparatus, operations are carried out in the following manner: as shown in FIG. 5, laser beams are emitted from the laser beam source 35 as shown in FIG. 5 being controlled by the CPU; and the photoreceptor drum surface 29 charged by the charging electrode 40 is exposed to the laser beams. In this manner, the first exposure shown in FIG. 1(b) is carried out.

Next, yellow toner is developed by the developing unit 30 as the first color, and the photoreceptor drum is charged again by the charging electrode 40 as shown in FIG. 1(d), and after the second exposure has been conducted by the laser beam source as shown in FIG. 1(e), magenta toner is superimposed on the yellow toner and developed by the developing unit 31.

In the same manner as described above, when cyan toner as the third color, and black toner as the fourth color are superimposed successively on the aforementioned color toner layers. The photoreceptor drum surface is, charged again, exposed, and the formed toner image is developed, the color toner image having four colors is formed on the surface of the photoreceptor drum 29.

As described above, the operations of charging, exposing and developing are successively conducted on the photoreceptor drum surface 29 that is rotated, and a color toner image formed through an accurate exposure control operation is transferred onto recording sheet P using the transfer belt 15, and the image is fixed by the fixing unit 19.

Figure 7:
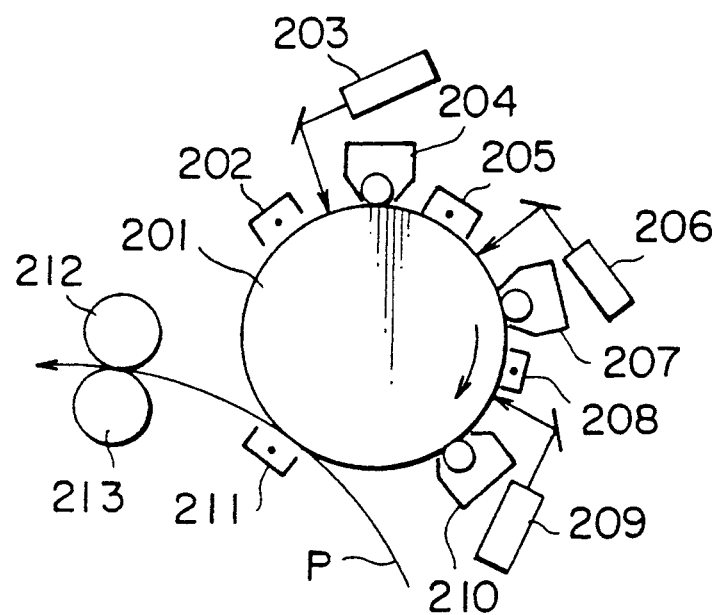
FIG. 7 is a view showing another example of the image forming apparatus to which the image forming means of the present invention is applied.

FIG. 7 shows another example to which the color image forming process of the present invention is applied. In the example, the first image forming means composed of a charging electrode 202, an exposure means 203, and a developing section 204, the second image forming means composed of a charging electrode 205, an exposure means 206, and a developing section 207, and the third image forming means composed of a charging electrode 208, an exposure means 209, and a developing section 210 are provided respectively around the photoreceptor drum 201 which is an image carrier. Yellow color toner is loaded in the developing section 204 of the first image forming means, magenta color toner is loaded in the developing section 207 of the second image forming means, and cyan color toner is loaded in the developing section 210 of the third image forming means. After the electric charge is given to the photoreceptor drum 201 by the charging electrode 202, the optical control by the duty ratio is conducted by the exposure means 203 in the same manner as the above-described image forming process, and the color toner of yellow is developed by the developing section 204. At the next stage, charging is conducted on the photoreceptor drum 201 and the color toner of yellow is developed, and an electric charge elimination control by the pulse width control is conducted by the exposure means 209, and the color toner of magenta is developed by the developing section 207. The color toner of cyan of the third image forming means is superimposed on other colors and developed. This method is the method by which the image formation is conducted when the photoreceptor drum 201 is rotated by one revolution, and the color image is transferred onto a recording sheet P by a transfer electrode 211, and the color toner which is conveyed between a thermal fixing roller 212 and a pressure contact roller 213, is fixed onto the recording sheet P.

Figure 8:
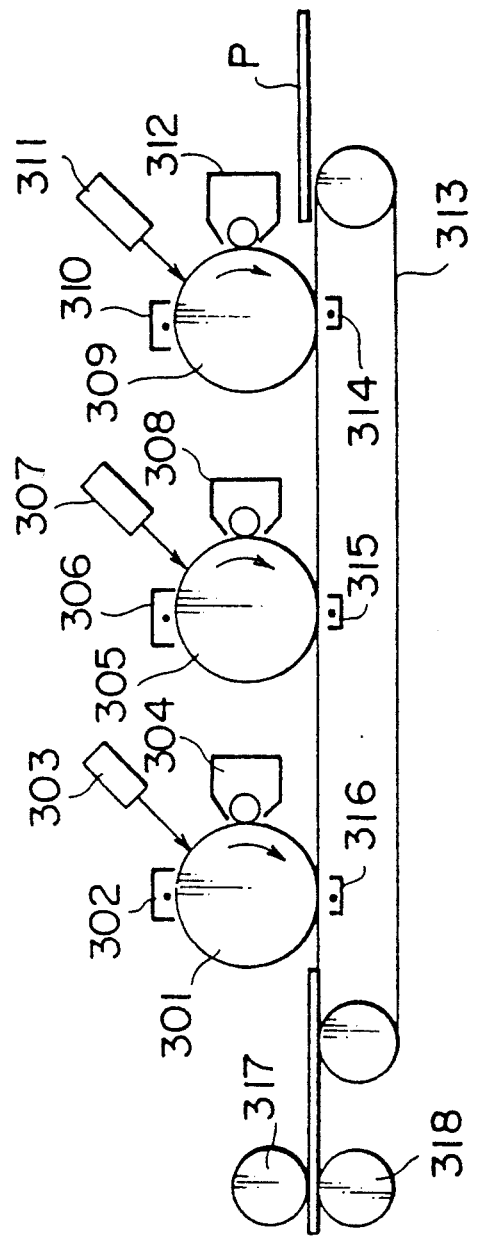
FIG. 8 is a view showing another example of the image forming apparatus to which the image forming means of the present invention is applied.

Next, the example shown in FIG. 8 is an image forming apparatus to which the color image forming process of the present invention is applied in the same manner as the foregoing. In the example, the first image forming means in which a charging electrode 310, an exposure means 311 and a developing section 312 are provided around a photoreceptor drum 309, the second image forming means in which a charging electrode 306, an exposure means 307 and a developing section 308 are provided around a photoreceptor drum 305, and the third image forming means in which a charging electrode 302, an exposure means 303, and a developing section 304 are provided around a photoreceptor drum 301, are provided, and a recording sheet conveyance belt 313 which is contacted in common with the photoreceptor drum 309 of the first image forming means, the photoreceptor drum 305 of the second image forming means, and the photoreceptor drum 301 of the third image forming means, is provided, and further transfer electrodes 314, 315, and 316 are provided through the recording sheet conveyance belt in the positions opposed to the photoreceptor drums 309, 305, 301, and a yellow developing unit is provided in the developing section 312, a magenta developing unit is provided in the developing section 308, and a cyan color toner developing unit is provided in the developing section 304. When the color image forming process of the present invention is applied to an image forming apparatus, the photoreceptor drum 309 to which the electric charge is given by the charging electrode 310, is exposed by the exposure means 311 by which the optical control by the duty ratio is conducted, a yellow color toner is developed by the developing unit 312, and the recording sheet P is conveyed by the recording sheet conveyance belt 313 when development has been completed, and the yellow image is transferred onto the transfer electrode 314. Next, the photoreceptor drum 305 to which the electric charge is given by the charging electrode, is exposed by the exposure means 307 by which the optical control by the duty ratio is conducted so that the second color toner is superimposed on the recording sheet P, and after that, the color toner of magenta is developed by the developing unit 308, and the color toner of magenta which is 2 V formed on the photoreceptor drum is transferred by the transfer electrode 315 so that it is superimposed on the color toner of yellow which has been formed on the recording sheet P. As described above, the image forming process of the present invention is used for two color toners as shown in FIGS. 7 and 8, and is structured in the manner that the amount of each color toner is transferred equally when two colors are superimposed. Further, in the foregoing example, only the case of three primary colors is explained, however, of course, a developing unit using black toner may be added to this system.

Although not shown in the example, the following method may be adopted that three color or four color toner image is formed on the photoreceptor drum, and the color image is transferred onto the recording sheet through a transfer drum.

The present invention is to provide a color image forming apparatus in which an accurate color image is formed in the following manner: a light source such as a laser, LED array and liquid crystal, is controlled by an image signal outputted form the CPU or image memory so that the color toner developing amount is adjusted. Therefore, color tone of all kinds of images can be reproduced correctly.

Figure 9:
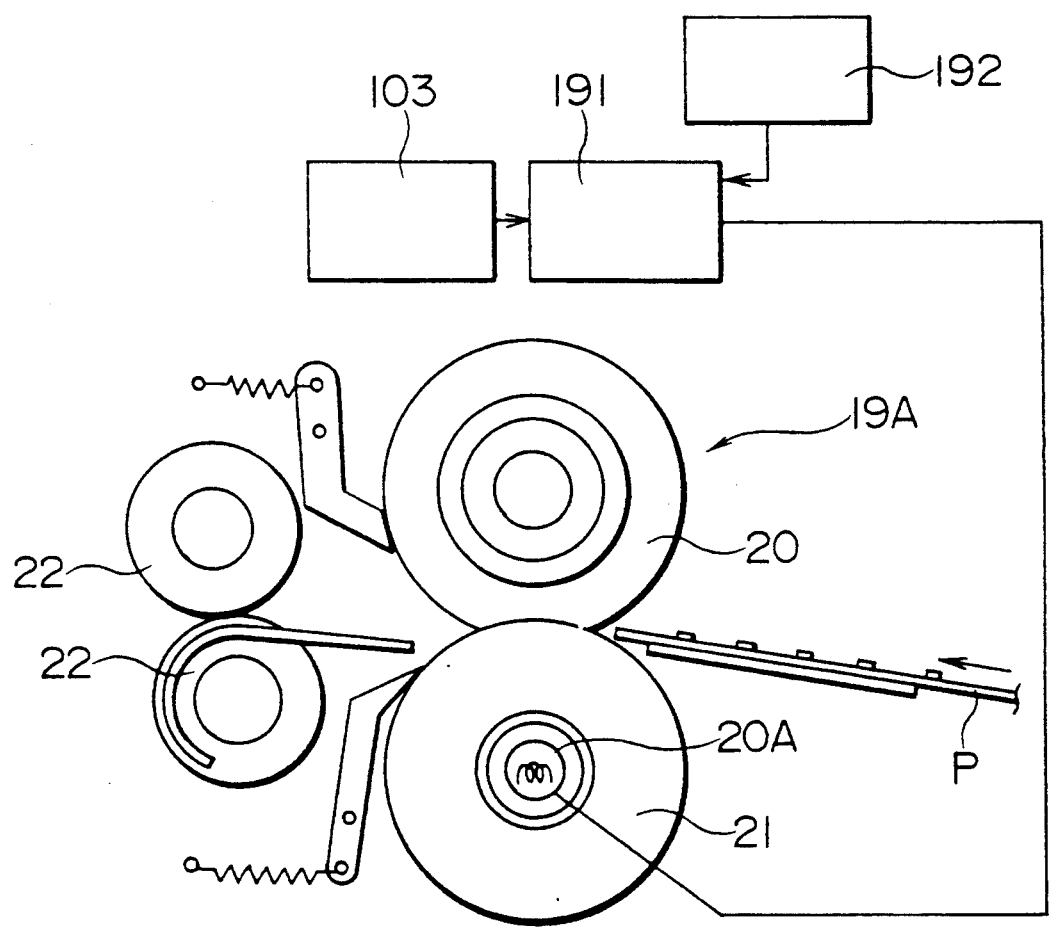
FIG. 9 is a front view showing the fixing unit of the present invention.

Next, an example to accomplish the first object will be explained as follows, wherein the aforementioned image forming apparatus equipped with the exposure control device is used in the example. FIG. 9 shows a control system to control image formation performed in the image forming apparatus of the present invention shown in FIG. 6. Like parts in each of the figures are identified by the same reference character. In this example, when a paper supply signal is outputted from the CPU, the paper feed roller is rotated and recording sheet P is supplied from the paper feed cassette 3. When recording sheet P sent out from the cassette 3 is conveyed by the conveyance roller 8 through the guide plate 9, the kind of recording sheet P is detected by sensor $S_3$, that is, it is detected whether recording sheet P is a regular paper or an OHP paper. When a signal representing the result of the detection is sent to the CPU, the voltage of the grid electrode 40A provided to the charging electrode 40 is adjusted by the voltage adjustment unit 40B in such a manner that: for example, in the case of a regular paper, the grid voltage is −730V; and in the case of an OHP sheet, the grid voltage is −800V. The adjusted voltage is impressed upon the surface of the rotating photoreceptor drum 29 by the charging electrode 40. Next, the information expressing the kind of paper, that is, whether or not a regular paper is used, or whether or not an OHP sheet is used, is supplied from the CPU. Then, as shown in FIGS. 2(a) and 2(b), the following operations are carried out in the recording image signal processing section 103 by the printer controller 101: edge detection, color recording correction, image density adjustment, color adjustment, and gamma correction. After that, the surface of the photoreceptor drum 29 is exposed with a laser beam emitted from the laser beam source 35 driven by the laser drive section 108. In the case of a full color image, not less than 2 colors are superimposed in the image.

TABLE 1

| Recording Sheet Fixing Speed | | Regular 74 mm/s | OHP 12 mm/s |
|---|---|---|---|
| Duty (%) | Monocolor | | |
| | Solid Image | 100 | 100 |
| | Isolated Dot and Edge Superimposition | 100 | 50 |
| | Solid Image | | |
| | First color | 50 | 50 |
| | Second Color | 100 | 100 |
| | Isolated Dot and Edge | | |
| | First Color | 60 | 40 |
| | Second Color | 100 | 60 |

Table 1 shows the duty ratios of the pulse width of laser modulation signals in the case of image formation. The above table shows the duty % in two cases, wherein a regular paper is used in one case, and an OHP sheet is used in the other case. In the case of monocolor in which toner superimposition is not made, duty ratio % of the isolated dot and edge dot on an OHP sheet is reduced to 50%, wherein duty ratio % of the isolated dot and edge dot on a regular paper is 100%. In the case of superimposition, duty ratio is changed according to the judgment about the edge portion. In the case of superimposition of a solid image, duty ratio may be changed according to the kind of paper, that is, whether the paper is a regular paper or an OHP paper. In order to prevent the line width and dot diameter from being changed by a fixing mode, in the case of the isolated dot and edge dot, when a regular paper is inputted, duty ratio of the first color is 60%, and that of the second color is 100%. When an OHP sheet is inputted, duty ratio of the first color is reduced to 40%, and that of the second color is reduced to 60%. In order to obtain preferable color tone, duty ratios of the first and second colors can be adjusted through an operation panel. Changeover of the fixing speed shown in Table 1 will be described later.

TABLE 2

| Recording Sheet<br>Fixing Speed | Regular Paper<br>74 mm/s | OHP Sheet<br>12 mm/s |
| --- | --- | --- |
| Duty Ratio (%) | | |
| Solid Image | 100 | 100 |
| Isolated Dot and Edge | 100 | 50 |

Table 2 shows duty ratios of the pulse width of a laser modulation signal in the case of monocolor image formation. duty ratio of a solid image in the case of a regular paper, and that of an OHP sheet are 100%. However, duty ratio of an isolated dot and edge dot in the case of an OHP sheet reduced to 50% so that the OHP sheet is exposed. Changeover of the fixing speed shown in Table 2 will be explained in detail later.

In the case of a regular paper or OHP sheet detected by sensor S3, duty ratio is controlled in the aforementioned manner so that the paper can be exposed.

Figure 3A:
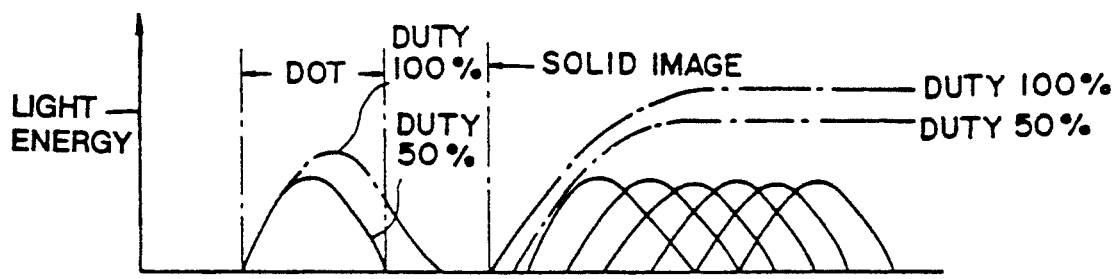
FIGS. 3 (a), 3(b), 3(c) are views showing exposure control in an dot image and a solid image.
Figure 3B:
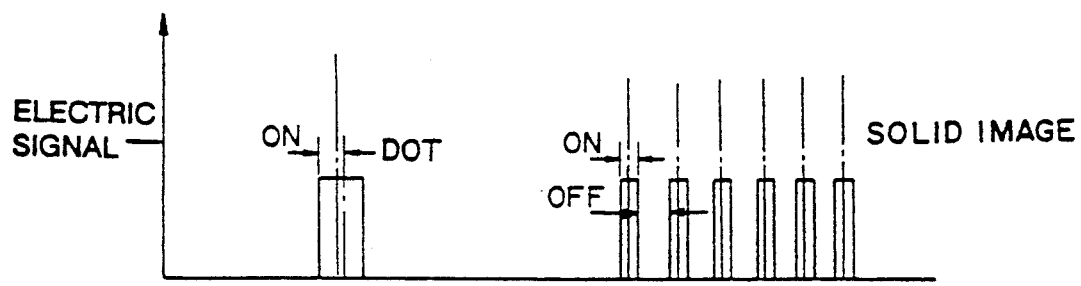
Figure 3C:
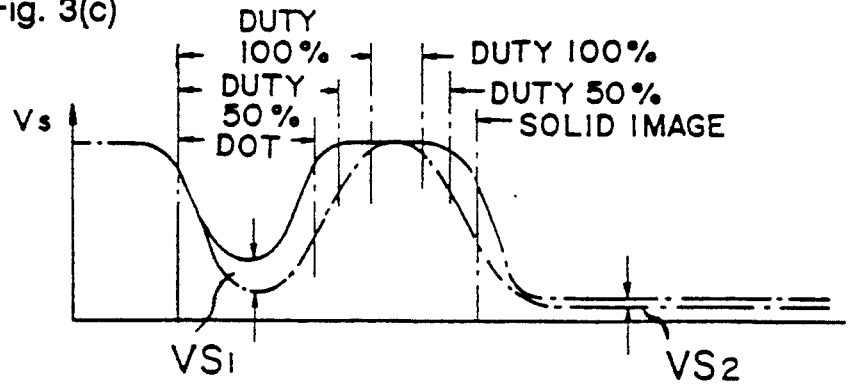
Figure 4A:
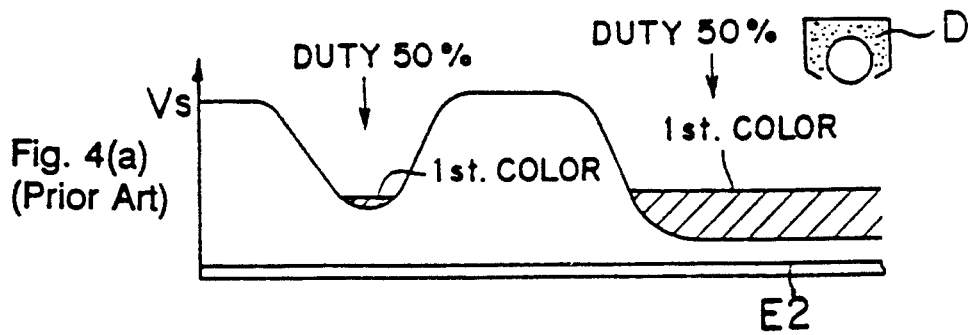
FIGS. 4(a), 4(b), 4(c) and 4(d) are views showing conventional development of color toners in a dot image and solid image.
Figure 4B:
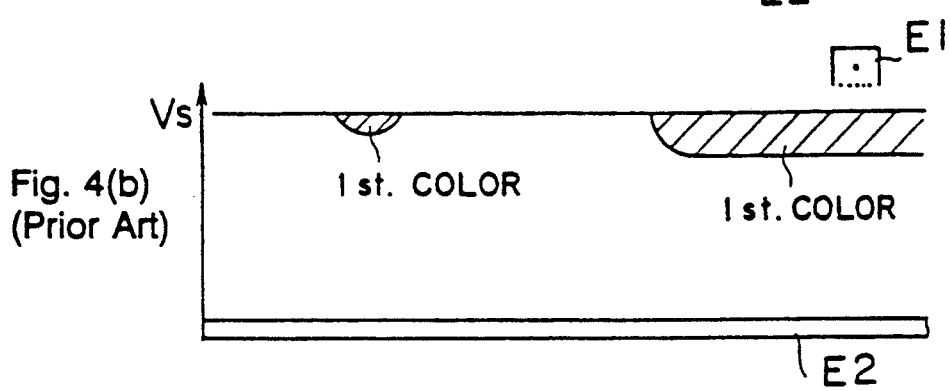
Figure 4C:
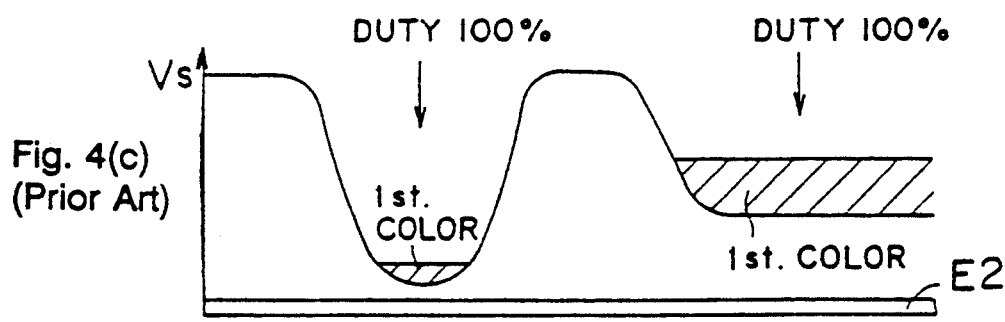
Figure 4D:
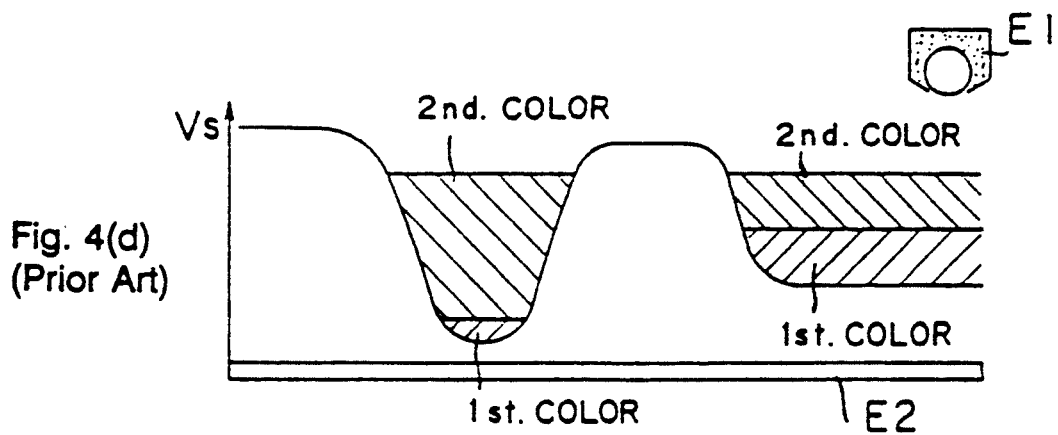

Next, developing operations are successively carried out by the developing units 30, 31, 32 and 33. As shown in FIG. 3, the bias power source 300 is connected with the developing unit 30, and motor M1 to drive the developing sleeve is connected with the drive control power source 301. The developing unit 31 is connected with the bias power source 310, and motor M2 to drive the developing sleeve is connected with the drive control power source 311. The developing unit 32 is connected with the bias power source 320, and motor M3 to drive the developing sleeve is connected with the drive control power source 321. The developing unit 33 is connected with the bias power source 330, and motor M4 to drive developing sleeve is connected with the drive control power source 331.

When monochromatic developing operations are carried out by the aforementioned 4 developing units, one of the developing units 30, 31, 32 and 33 is used to conduct development on a latent image formed on the surface of the photoreceptor drum 29, wherein exposure is adjusted according to the duty ratio shown in Table 1. The bias voltage to be impressed upon each developing unit is supplied from the bias power sources 300, 310, 320 and 330 wherein the bias voltage is adjusted by the CPU according to each image. Rotation of motors M1, M2, M3 and M4 to rotate the developing sleeve is adjusted when the drive power sources 301, 311, 321 and 331 are controlled by the CPU in accordance with each image.

When full color image developing operations are carried out, the developing units 30, 31, 32 and 33 are successively used to conduct development on a latent image formed on the surface of the photoreceptor drum 29, wherein exposure is adjusted according to the duty ratio shown in Table 1. In the aforementioned examples, the line width dot diameter is controlled according the exposure condition. Next, an example will be explained as follows in which the line width dot diameter is controlled by the development bias.

TABLE 3

| AC Bias Voltage With Respect To Each Developing Color | | |
| --- | --- | --- |
| Recording Sheet | Regular Paper | OHP Sheet |
| Developing Color | | |
| Yellow | 2.4 KV | 2.0 KV |
| Magenta | 2.4 KV | 2.0 KV |
| Cyan | 2.4 KV | 2.0 KV |
| Black | 2.4 KV | 2.0 KV |

As shown in Table 3, when yellow is developed with the developing unit 30, the bias voltage is supplied from the bias voltage 300 in the following manner: in the case of a regular paper, "peak to peak" AC bias voltage is set at 2.4 KV; and in the case of an OHP sheet, it is set at 2.0 KV. In the case where a color image is developed by the developing units 31, 32 and 33 of magenta, cyan and black, a latent image on a regular paper is developed at AC bias voltage of 2.4 KV, and a latent image on an OHP sheet is developed at AC bias voltage of 2.0 KV. Accordingly, AC bias voltage in the case of an OHP sheet is reduced by 10 to 50% compared with the bias voltage in the case of a regular paper. The higher the bias voltage is, the more the development is facilitated. In this case, there is a tendency that the edge portions such as a line and dot are emphasized so that they become bold. Therefore, in the OHP sheet mode, the AC bias is lowered so that the line width and dot diameter can be the same as those in the regular paper mode.

By the method described above, recording sheet P is discriminated to find whether it is a regular paper or an OHP sheet, and exposure and development operations are controlled according to the result of the discrimination. After that, an image formed on the photoreceptor drum 29 is transferred onto recording sheet P by the transfer belt 15. When both variable control of the pulse width of a laser modulated signal and variable control of the developing bias are carried out in order to cope with the change of the fixing condition, image quality can be effectively made uniform.

Figure 13:
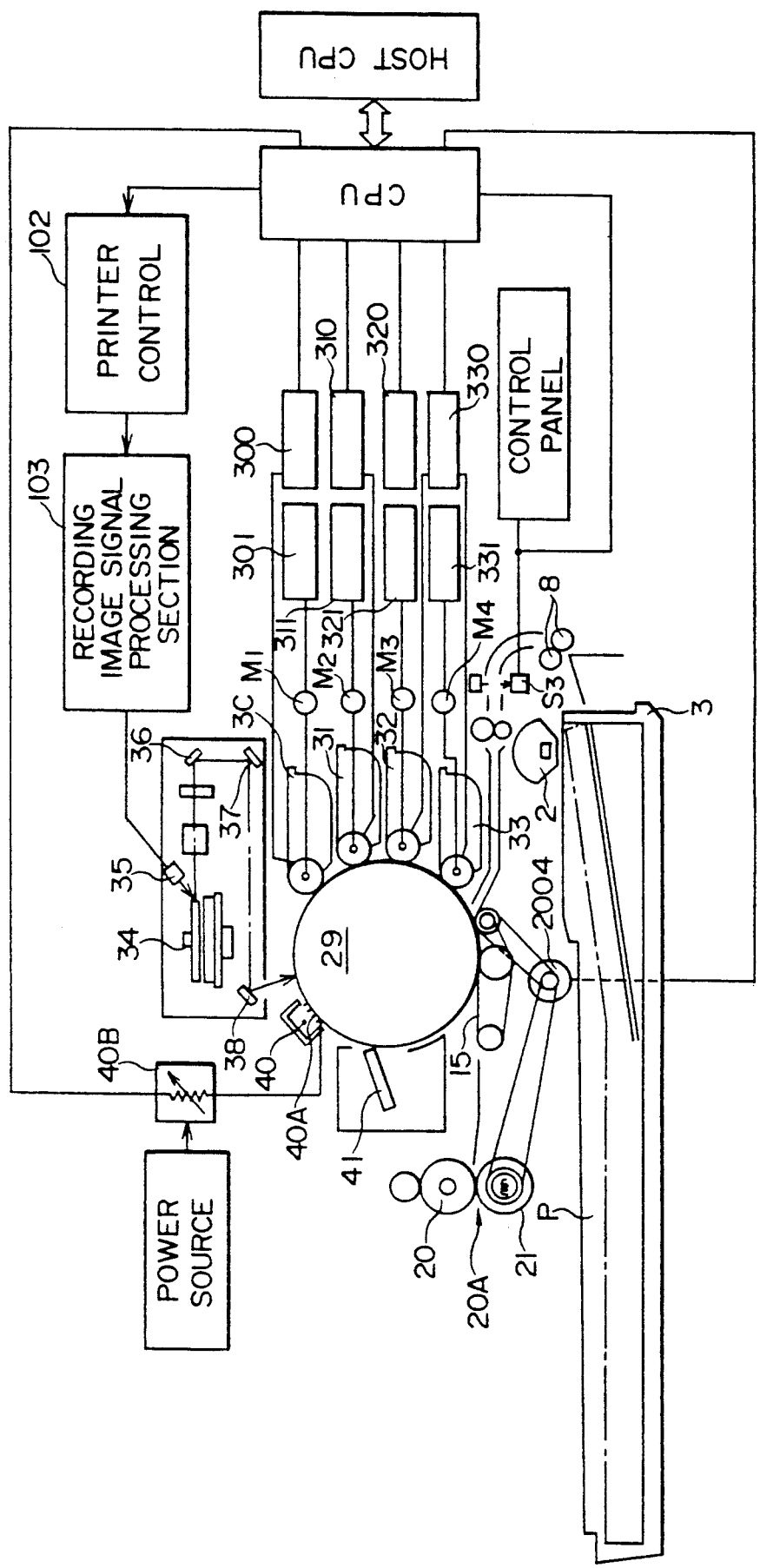

The fixing speed of recording sheet P onto which a monochromatic or color image has been formed, is changed according to the paper. A motor 2004 shown in FIG. 13 may drive the transfer belt 15 shown in FIG. 6 together with the heating roller 21 for fixing. The heating roller 21 for fixing is provided with a heat source 20A or 200 as shown in FIG. 9, and the heat source is connected with a voltage regulator 191 so as to control the temperature of the heat source. Numeral 192 denotes a power source for the heat source 20A.

In order to thermally fix the image formed on recording sheet P, it is fed between the heating roller 21 for fixing and the pressure roller 20. In the case where recording sheet P is a regular one, the fixing speed is set at 74 mm/s as shown in Tables 1 and 2 in both cases of monochromatic or color image. In the case where recording sheet P is an OHP sheet, the fixing speed of 12 mm/s is the most appropriate to obtain an image of high quality.

An example of the fixing unit will be explained as follows. In the example, a toner image on recording sheet P can be excellently fixed when the heat supplied to the heating roller 21, pressure contact force of the pressure contact roller 20 and fixing speed are appropriately changed.

The fixing unit 19A shown in FIG. 9 will be explained here under the condition that like parts in FIGS. 6 and 9 are identified by the same reference character. The fixing unit 19B includes the heating roller 21 for fixing and the pressure roller 20. The heat source 20A for heating is provided in the heating roller 21 for fixing.

The voltage impressed upon the heat source 20B for heating is adjusted by the voltage regulator 191 being controlled by the recording image signal processing section 103 to which an image signal is sent from the printer controller 101 shown in FIG. 2. The voltage is impressed upon the heat source 20A through the voltage regulator 191. When an image signal is received from the printer controller 101, exposure is conducted on the photoreceptor drum 29 which has been charged by the charging electrode 40, and then the formed image is developed. At this time, character A shown in FIG. 2(a) is outputted, that is, image information is outputted, so that an ON signal is generated in the laser beam source 35 controlled by the recording image signal processing section 103 in the laser printer 102.

After a controlled exposure operation has been conducted on the photoreceptor drum 29, the image is developed by the developing unit 30. Then, the developed image is transferred onto recording sheet P. When recording sheet P advances into the fixing unit 19A, the temperature of the unit is set, for example, at 180° C., and the toner image is thermally fixed by the heating roller 21 for fixing, and then recording sheet P is discharged from the apparatus by the discharging roller 22.

Figure 10:
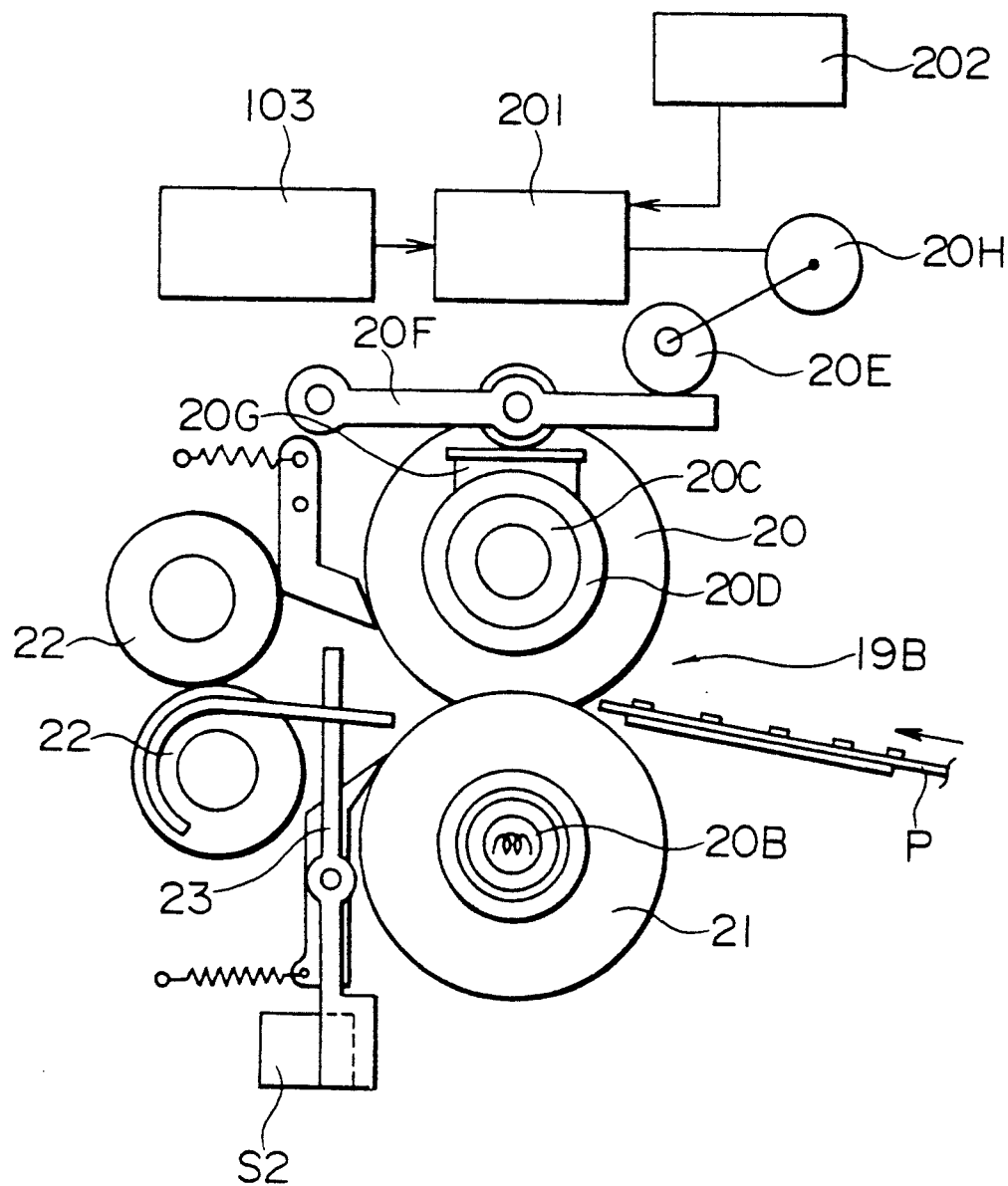
FIG. 10 is a front view showing another fixing unit of the present invention.

The fixing unit 19B in FIG. 10 is provided with the heating roller 21 for fixing and the pressure roller 20 by which the force given to recording sheet P can be adjusted. Further, the heat source 20B is provided in the heating roller 21 for fixing. The bearing 20D is mounted on the shaft 20C of the pressure roller 20. The mediation member 20G is brought into contact with the bearing 20D so that the contact force of the pressure roller 20 can be adjusted through the lever 20F when the cam 20E is rotated.

The cam 20E is driven by the drive motor 20H having a reduction gear, and the output means 201 is provided to control the rotation of the drive motor 20H. Numeral 202 denotes a power source of the motor 20H.

When an image signal is received from the printer controller 101, exposure is conducted on the photoreceptor drum 25 which has been charged by the charging electrode 40, and then the formed image is developed. At this time, character A shown in FIG. 2(a) is outputted, that is, image information is outputted, so that an ON signal is generated in the laser beam source 35 controlled by the recording image signal processing section 103 in the laser printer 102. The current outputted from the power source 202 is turned on and off by the output means 201 synchronously with the image control signal, so that the rotation of the motor 20H is controlled. As a result of the foregoing, the cam 20E is rotated, and pushes the mediation member 20G through the lever 20F, so that the bearing 20D mounted on the shaft 20C of the pressure roller 20 is pushed. After a controlled exposure operation has been conducted on the photoreceptor drum 29, the image is developed by the developing unit 30. Then, the developed image is transferred onto recording sheet P. When recording sheet P advances into the fixing unit 19B, it is held with pressure between the heating roller 21 and the pressure roller 20 since the pressure roller 20 is pushed by the action of the cam 20E. Then, the output means 201 is controlled so that the aforementioned pressing condition can be maintained until the trailing end of recording sheet P passes through sensor $S_2$. After the image has been thermally fixed onto recording sheet P, it is discharged by the paper discharge roller 22.

Figure 11:
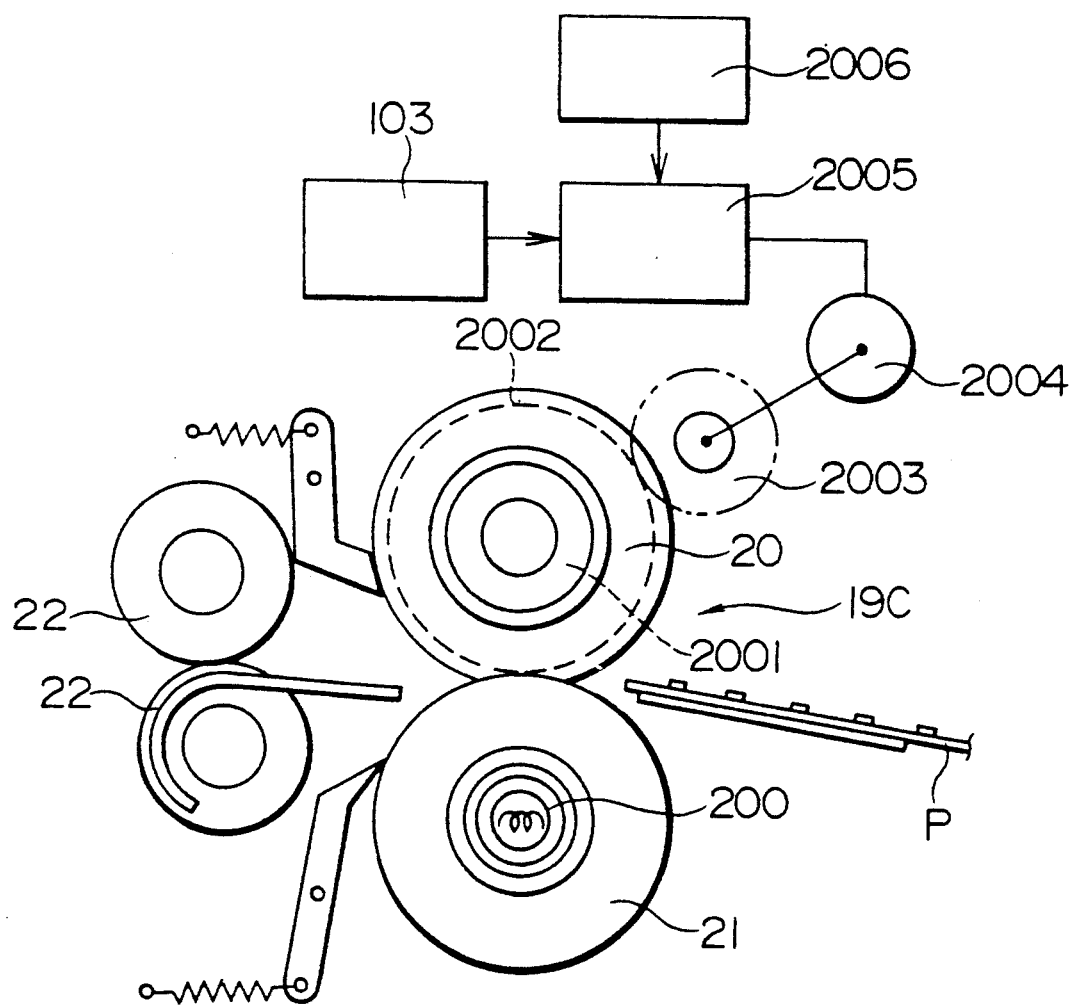
FIG. 11 is a front view showing another fixing unit of the present invention.

Next, the fixing unit 19C shown in FIG. 11 will be explained as follows. Like parts in each of FIGS. 6 and 11 are identified by the same reference character. The fixing unit 20A includes the heating roller 21 for fixing and the pressure roller 20, and the heat source 200 is provided in the heating roller 21 for fixing.

A drive gear 2002 is mounted on the shaft 2001 of the pressure roller 20. The drive gear 2002 is provided with an intermediate gear 2003, and a motor 2004 to drive the intermediate gear 2003 is provided coaxially or through another reduction means. A servomotor, the revolution speed of which can be freely adjusted, is preferably applied to the motor 2004.

Numeral 2005 denotes a control means to control the rotation of the motor 2004. In the control means 2005, a current supplied from the power source 2006 is controlled according to the information sent from the image processing section 103 so that the motor 2004 can be controlled.

In this example, an image signal in the form of a video signal is sent from the printer controller 101, and the photoreceptor drum 25 is charged by the charging electrode 40, and then exposure and development is conducted according to the image signal. At this time, character A shown in FIG. 2(a), that is, image information, is outputted, and an ON signal of the laser beam source is generated by the image information processing section 103 in the laser printer 102. Then, the current of the power source 2006 is controlled by the control means 2005 synchronously with a control signal controlled in the aforementioned manner, so that the rotation of the motor 2004 is controlled. After a controlled exposure operation has been conducted on the photoreceptor drum 25, the image is developed by the developing unit 30. Then, the developed image is transferred onto recording sheet P. When recording sheet P advances into the fixing unit 19C, the motor 2004 is controlled so that the fixing speed can be, for example, 74 mm/sec. An image is formed in accordance with the aforementioned controlled speed. Therefore, the heating roller 21 for fixing is rotated at an appropriate speed for the transferred image so that the image can be thermally fixed.

Figure 12:
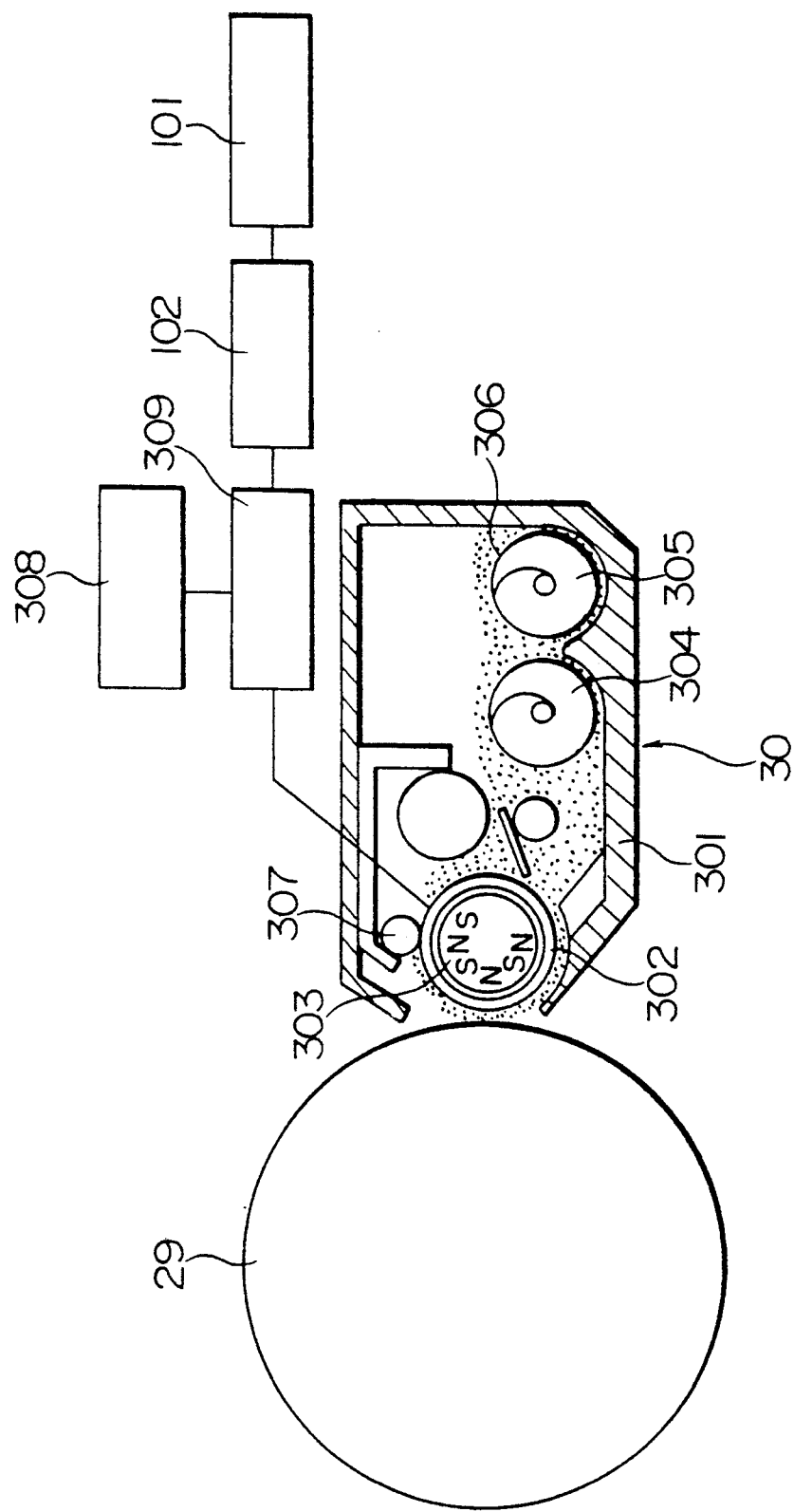
FIG. 12 is a longitudinal sectional view showing image formation conducted by bias control of the developing unit of the present invention.

FIG. 12 is a schematic illustration showing the structure inside the developing unit 30. Numeral 301 is a developing unit frame. The developing sleeve 302 is rotatably provided inside the frame 301 being opposed to the photoreceptor drum 29. The magnet 303 magnetized to N and S is installed in the developing sleeve 302. Numerals 304 and 305 are stirring members to stir the developer 306 including carrier and toner, wherein the stirring members 304 and 305 are installed inside the developing unit frame 301. The layer thickness of the stirred developer 306 that is conveyed by the developing sleeve 302, is regulated to be constant by the conveyance regulating member 307. Numeral 308 is a bias generator. The bias generator 307 is connected with the developing sleeve 302 through the bias voltage regulator 309. The bias voltage regulator 309 is connected with the printer controller 101 through the laser printer 102. In this example, the developing operation is carried out in the following manner: when the pressing force applied to recording sheet P by the heating roller 21 and the pressure roller 20, the fixing speed, and the heating temperature are changed, the changed values are inputted into the printer controller 101; only the bias voltage is adjusted by the bias voltage regulator 308 in accordance with the changed values; and the bias voltage is impressed upon the developing sleeve 302, so that the developing operation can be carried out by the appropriate bias voltage adjusted in accordance with the change of the fixing unit 19.

In order to effectively fix a color or monochromatic image transferred onto recording sheet P, the following three methods are explained above referring to examples: a method by which a heat source for fixing is controlled; a method by which the pressing force of the pressure roller 20 is adjusted; and the revolution speed of the heating roller for fixing is adjusted. The aforementioned three methods may be individually used, however, two of them or all of them may be combined.

As explained above, according to the present invention, the condition of the toner image forming process is changed in accordance with the change of the fixing condition. In other words, in the present invention, the following means are individually used or combined in order to provide an excellent image: a means by which charging and exposure conditions are changed according to the image signal of a nonedge portion, solid image portion, and isolated dot and edge portion when the latent image is formed; a means by which the developing conditions are changed in such a manner that the bias voltage including DC and AC components is changed, the developer conveyance speed of the developing sleeve is changed, and the distance between the photoreceptor drum 29 surface and the developing sleeve surface, that is, DSD distance is changed so that the toner adhesion amount on the photoreceptor drum 29 is controlled; and a means by which the fixing conditions are changed in such a manner that the temperature of the thermal fixing roller is controlled, the revolution speed of the thermal fixing roller is changed, and the pressing force between the thermal fixing roller and the pressing roller is changed.

In the aforementioned example, the change of the exposure condition accompanied by the change of the fixing condition is carried out when the duty ratio is changed.

The change of the exposure condition can be conducted by not only changing the duty ratio but also changing the dot position and size by P.W.M modulation (pulse width modulation).

Figure 14:
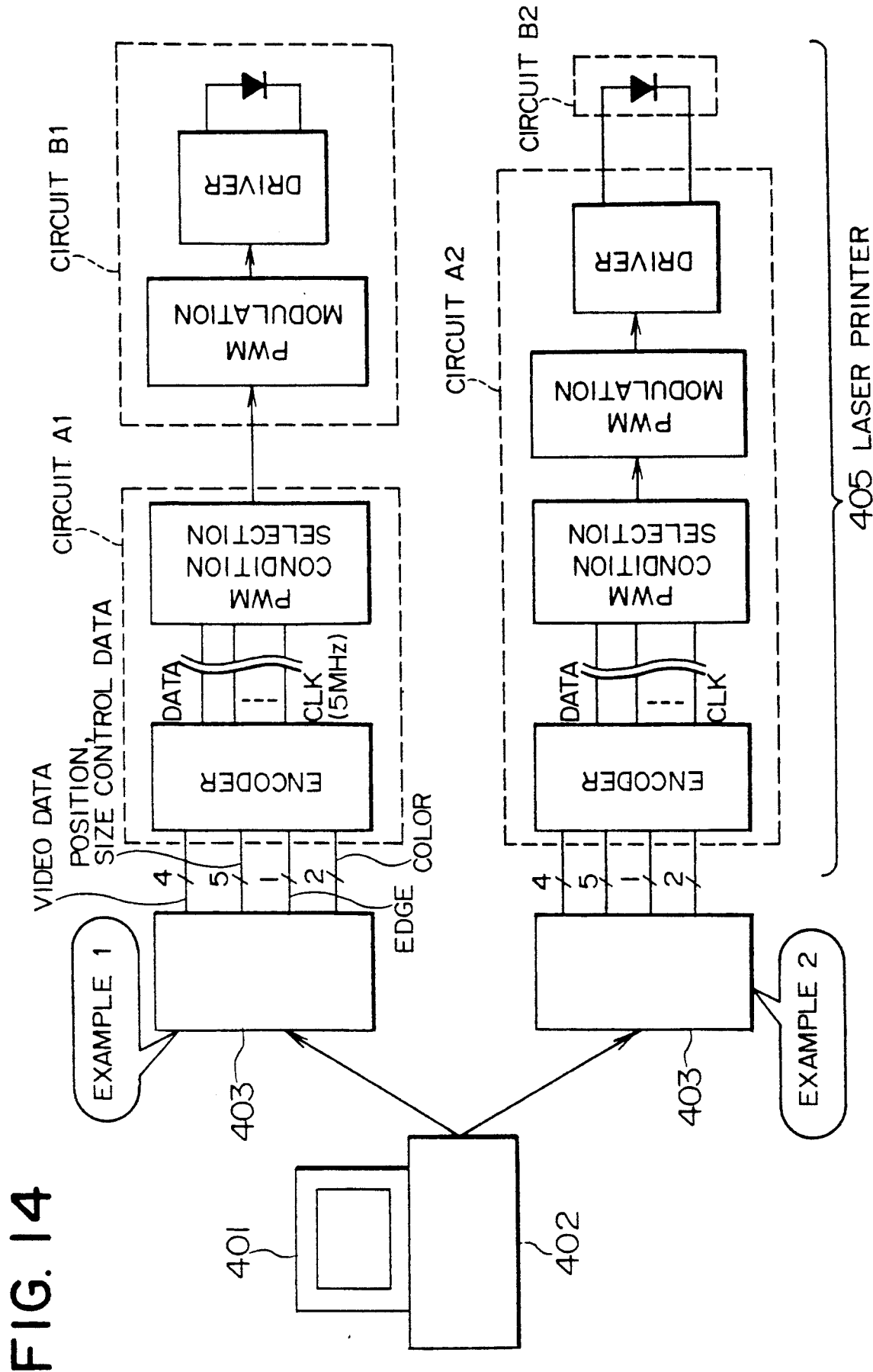
FIG. 14 is a block diagram showing a signal processing circuit that conducts P.W.M exposure control of the present invention.

FIG. 14 shows a circuit in which a scanning exposure operation can be carried out by the laser printer 405 according to the signal inputted by the host computer 401 in the same manner as that shown in FIG. 2.

In FIG. 14, the image signal is inputted as a video signal into the laser printer 405 through the print controller 403. At this time, control data of the dot size and dot position determined in accordance with the fixing condition is concurrently inputted.

In the laser printer, the laser driver is controlled by means of P.W.M control in accordance with inputted control data of the dot position and dot size so that a desired toner dot can be formed.

Figure 15C:
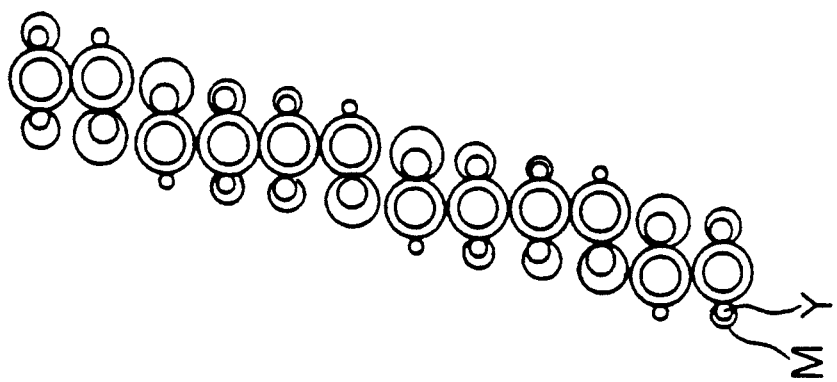
FIGS. 15(b) and 15(c) are views showing a dot image in the case where diagonal lines are formed by P.W.M exposure control of the present invention.
Figure 15B:
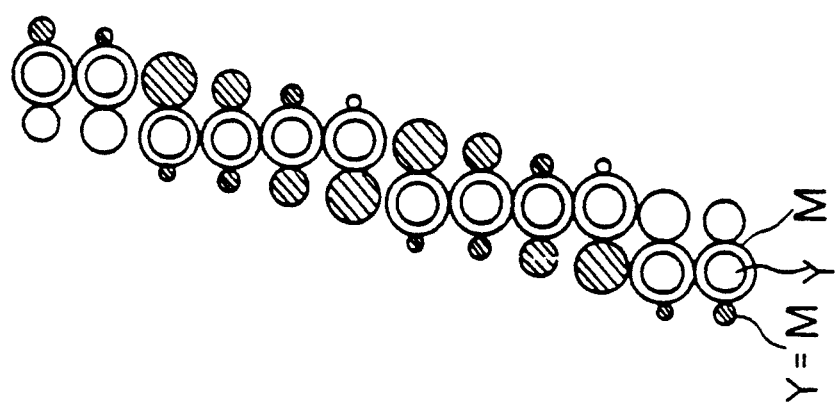
Figure 15A:
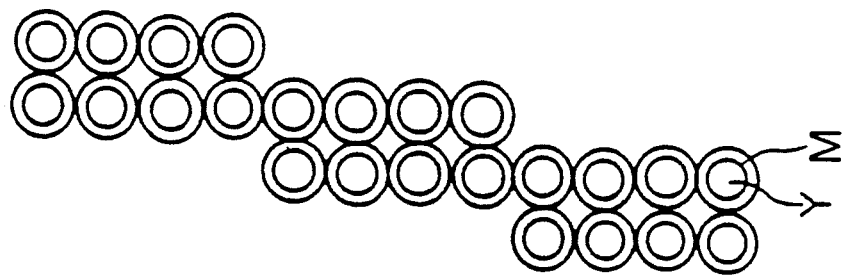
FIG. 15(a) is a view of a dot image in the case where diagonal lines are formed by conventional technique.

FIG. 15 shows an example in which diagonal lines are printed by this P.W.M control. The conventional dot forming method is shown in FIG. 15(a). When the dot position and dot size are controlled by means of P.W.M control conducted by the exposure control circuit shown in FIG. 14, gentle diagonal lines can be provided as shown in FIGS. 15(b) and 15(c).

When the dot position and dot size are changed by this P.W.M control in accordance with the change of the fixing condition, the fluctuation of line width and dot diameter can be corrected.

The present invention is to provide an image forming apparatus in which laser beams for exposure are controlled and images are formed by the most appropriate amount of developer. Further, the image transferred onto recording sheet P is fixed at the most appropriate temperature, fixing pressure and fixing speed being linked with the aforementioned exposure condition. Accordingly, deformation of the image can be avoided, so that an excellent character image or a solid image can be obtained.

What is claimed is:

1. An apparatus for forming an image on a transfer sheet, comprising:
    image carrying means having an imaging surface on which an electrostatic latent image is formed;
    charging means for charging in the imaging surface to an electrical potential;
    exposing means for exposing the imaging surface with a image exposure beam which is modulated by an image signal so as to form a dot-shaped electrostatic latent image on the imaging surface;
    developing means for developing the latent image to form a dot-shaped toner image;
    transferring means for transferring the dot-shaped toner image onto the transfer sheet;
    fixing means, responsive to a plurality of fixing conditions, for fixing the dot-shaped toner image on the transfer sheet;
    first control means for changing at least one of the plurality of fixing conditions to which the fixing means is responsive; and
    second control means for controlling at least one of a charging condition of the charging means, an exposure condition of the exposing means and a developing condition of the developing means to change a toner amount in the dot-shaped toner image on the imaging surface in accordance with the change of the at least one of the plurality of fixing conditions by the first control means so that a change in a size of the dot-shaped toner image to be fixed is prevented regardless of the change in the at least one of the plurality of fixing conditions by the first control means.

2. The apparatus of claim 1, wherein:
    the fixing means comprises a heater to heat a transfer sheet and a conveying member to convey the transfer sheet at a conveying speed; and
    the first control means changes at least one of a heating temperature and the conveying speed.

3. The apparatus of claim 1, wherein:
    the fixing means comprises:
    a heat roller for heating the transfer sheet while applying a pressing force to the transfer sheet; and
    the first control means changes a pressure of the pressing force of the heat roller.

4. The apparatus of claim 1, wherein:

the developing means develops the latent image on the imaging surface while a bias voltage is applied between the developing means and the imaging surface; and the second control means changes the bias voltage, said bias voltage being one of the developing conditions.

5. The apparatus of claim 1, wherein the second control means changes an exposure amount of the exposing means.

6. The apparatus of claim 1, wherein the exposing means comprises one of a laser beam generator, a L.E.D. array and a liquid crystal shutter device.

7. The apparatus of claim 6, wherein the second control means changes an exposure amount of the exposing means.

8. The apparatus of claim 6, wherein the second control means controls the exposing means to change a duty ratio between an ON period and an OFF period of the exposing means so that the exposure amount on the dot-shaped electrostatic latent image is changed.

9. An apparatus for forming an image on a transfer sheet, comprising:
   image carrying means having an imaging surface on which an electrostatic latent image is formed;
   means for charging the imaging surface to an electrical potential;
   means for exposing the imaging surface with an image exposure beam which is modulated by an image signal so as to form a dot-shaped electrostatic latent image on the imaging surface;
   means for developing the latent image to form a toner image;
   means for transferring the toner image onto the transfer sheet;
   means for fixing the toner image on the transfer sheet;
   first control means for changing at least one of a plurality of fixing conditions of the fixing means;
   means for discriminating whether the dot-shaped image is one of an isolated dot and an edge dot; and
   second control means for controlling the exposing means to change at least one of a dot size and a dot position of the dot-shaped image discriminated by the discriminating means to be one of the isolated dot and the edge dot for changing a toner amount in the dot-shaped toner image on the imaging surface in accordance with the change in the at least one of the plurality of fixing conditions by the first control means.

10. An apparatus for forming a color image on a transfer sheet, comprising:
    image carrying means having an imaging surface on which an electrostatic latent image is formed;
    charging means for charging the imaging surface to an electrical potential;
    exposing means for exposing the imaging surface with an image exposure beam which is modulated by an image signal so as to form a dot-shaped electrostatic latent image on the imaging surface;
    a plurality of different color developing means for forming a dot-shaped color toner image;
    transferring means for transferring the dot-shaped color toner image onto the transfer sheet;
    fixing means responsive to a plurality of fixing conditions for fixing the dot-shaped color toner image on the transfer sheet;
    first control means for changing at least one of the fixing conditions of the fixing means; and
    second control means for controlling at least one of a charging condition of the charging means, an exposure condition of the exposing means and a developing condition of at least one of the plurality of developing means to change a toner amount in the dot-shaped color toner image on the imaging surface in accordance with the change of the at least one fixing condition by the first control means so that a change in one of a size and a color tone of the dot-shaped color toner image to be fixed by the fixing means is prevented regardless of the change in the at least one of the fixing conditions by the first control means.

11. An apparatus for forming a color image on a transfer sheet, comprising:
    image carrying means having an imaging surface on which an electrostatic latent image is formed;
    means for charging the imaging surface to an electrical potential;
    means for exposing the imaging surface with an image exposure beam which is modulated by an image signal so as to form a dot-shaped electrostatic latent image on the imaging surface;
    a plurality of developing means differing in color to form a color toner image;
    means for transferring the toner image onto the transfer sheet;
    means for fixing the toner image on the transfer sheet;
    first control means for changing at least one of a plurality of fixing conditions of the fixing means;
    means for discriminating whether or not the dot-shaped image is one of an isolated dot and an edge dot; and
    second control means for controlling the exposing means to change at least one of a dot size and a dot position of the dot-shaped image discriminated as one of the isolated dot and the edge dot to change a toner amount in the dot-shaped toner image on the imaging surface in accordance with the change in the at least one of the plurality of fixing conditions.

12. The apparatus of claim 1, wherein the first control means changes the at least one of the fixing conditions of the fixing means in accordance with a characteristic of the transfer sheet.

13. The apparatus of claim 12, wherein the fixing means comprises:
    a heater;
    a conveying member; and
    a pressing member;
    whereby, when the transfer sheet is a transparent resin film sheet:
    the first control means controls at least one of the heater, the conveying member and the pressing member so that at least one of a heating temperature is changed to be higher than a temperature required for an ordinary copy paper, a conveying speed is changed to be slower than a conveying speed required for the ordinary copy paper, and a pressing force is changed to be greater than a pressing force required for the ordinary copy paper.

14. The paper of claim 13, wherein the second control means changes a toner amount on the transparent resin film sheet so be smaller than a toner amount required for the ordinary copy paper.

15. The apparatus of claim 1, further comprising:
    discriminating means for discriminating a type of image; and wherein:

the second control means changes a toner amount for each of a plurality of pixels in accordance with a characteristic of the discriminated type of image.

16. The apparatus of claim 15, wherein the second control means changes a toner amount of at least one of a thin image and an edge portion of the discriminated type of image, to be smaller than a toner amount required for a solid image of said discriminated type of image.

17. The apparatus of claim 15, wherein the second control means changes a toner amount of one of a thin image and an edge portion of the discriminated type of image to be smaller than a toner amount required for a solid image of said discriminated type of image.

18. The apparatus of claim 15, wherein the second control means changes a toner amount ratio between one of a plurality of toner images of a thin image and an edge portion of the discriminated type of image and a toner amount required for a solid image of said discriminated type of image.

19. The apparatus of claim 1, wherein the first control means changes the at least one of the plurality of fixing conditions in accordance with a glossiness of the toner image to be formed.

20. The apparatus of claim 10, further comprising:
process means for processing the color image to produce a plurality of color component image signals; and
operation means for operating the image carrying means, the charging means, the exposing means and one of the plurality of different color developing means for each color component image signal, so that a plurality of color toner images corresponding to the plurality of color component image signals are superimposed on each other on the image carrying means.

21. The apparatus of claim 10, further comprising:
discriminating means for discriminating a type of image; and wherein
the second control means changes a toner amount for each of a plurality of color component image signals of each of a plurality of pixels in accordance with a characteristic of the type of image discriminated by the discriminating means.

* * * * *